United States Patent
Olivier et al.

(10) Patent No.: US 11,708,304 B2
(45) Date of Patent: Jul. 25, 2023

(54) DESERT SAND AND FILAMENTOUS CELLULOSE IN CONCRETE AND MORTAR

(71) Applicant: FPInnovations, Pointe-Claire (CA)

(72) Inventors: Eric Olivier, Saint-Paul d'Abbotsford (CA); Xiaolin Cai, Kirkland (CA); Carole Larouche, Châteauguay (CA); Xiaoyu Wang, S-Laurent (CA)

(73) Assignee: FPINNOVATION, Pointe-Claire (CA)

( * ) Notice: Subject to any disclaimer, the term of this patent is extended or adjusted under 35 U.S.C. 154(b) by 0 days.

(21) Appl. No.: 16/967,437

(22) PCT Filed: Feb. 12, 2019

(86) PCT No.: PCT/CA2019/050175
§ 371 (c)(1),
(2) Date: Aug. 5, 2020

(87) PCT Pub. No.: WO2019/157593
PCT Pub. Date: Aug. 22, 2019

(65) Prior Publication Data
US 2021/0214277 A1    Jul. 15, 2021

Related U.S. Application Data

(60) Provisional application No. 62/629,851, filed on Feb. 13, 2018.

(51) Int. Cl.
*C04B 18/24* (2006.01)
*C04B 14/06* (2006.01)
*C04B 28/04* (2006.01)

(52) U.S. Cl.
CPC ............ *C04B 18/24* (2013.01); *C04B 14/068* (2013.01); *C04B 28/04* (2013.01)

(58) Field of Classification Search
CPC ....... C04B 14/04; C04B 14/068; C04B 14/10; C04B 16/0608; C04B 18/24; C04B 20/006; C04B 20/0076; C04B 28/021; C04B 28/04; C04B 28/06; C04B 28/08; C04B 28/10; C04B 28/34; Y02W 30/91
See application file for complete search history.

(56) References Cited

U.S. PATENT DOCUMENTS

2014/0352578 A1    12/2014    Baker

FOREIGN PATENT DOCUMENTS

| CN | 101696100 A | * | 4/2010 | ........... C04B 14/102 |
|---|---|---|---|---|
| CN | 104230252 A | * | 12/2014 | |
| CN | 105036651 | | 11/2015 | |
| CN | 105036652 | | 11/2015 | |
| CN | 105256709 A | * | 1/2016 | |
| CN | 107513889 | | 12/2017 | |
| CN | 108203264 | | 6/2018 | |
| CN | 109111162 | | 1/2019 | |
| EP | 1227199 | | 7/2002 | |
| JP | H0910504 | | 4/1997 | |
| JP | 2015048276 | | 3/2015 | |
| JP | 2017-024938 | | 2/2017 | |
| WO | 2011/039423 | | 4/2011 | |
| WO | 2011039423 | | 4/2011 | |

OTHER PUBLICATIONS

Zhang, Haimei, "Chapter 5: Concrete", Building Materials in Civil Engineering, 2011, pp. 81-149.
Zhang et al. "Chapter 5 Concrete", Building Materials in Civil Engineering, Oxford: Woodhead Publ.; Beiging: Science Press, CN, 81-149. Jan. 1, 2011.
Anonymous, "Fineness Modulus of Sand (Fine Aggregates)—Calculations, Values", Internet Citation, Jan. 1, 2021, URL: https://theconstructor.org/practical-guide/fineness-modulus-of-sand-calculation/12465.
Third Party Observation filed in PCT/CA2019/050175. [2020].
Internatinal Preliminary Report on Patentabilty issued in PCT/CA2019/050175. [2020].

* cited by examiner

*Primary Examiner* — Anthony J Green
(74) *Attorney, Agent, or Firm* — Norton Rose Fulbright Canada

(57) ABSTRACT

The present provides a concrete and mortar mix and composition thereof with poor quality sand such as desert sand, hydraulic binder (cement) and filamentous cellulose, where the desert sand/spherical sand replaces conventional concrete river sands. The present disclosure also relates a filamentous cellulose, such as, cellulose filaments (CF), cellulose nano filaments, cellulose nanofibrils (CNF) and microfibrillated cellulose (MFC) as a concrete/mortar and sand adhesion additive with hydraulic binder (cement), and to a method of making the concrete. This method also relates to a method to prevent the sliding of individual sand grains against one another and therefor similarly contributes to the stabilization of the building materials.

17 Claims, 13 Drawing Sheets

(1)  (2)  (3)  (4)

A

B

C (A) (B) (C)

(A) (B)

DESERT SAND AND FILAMENTOUS CELLULOSE IN CONCRETE AND MORTAR

CROSS-REFERENCE TO RELATED APPLICATIONS

The present application is a U.S. National Phase of International Application No. PCT/CA2019/050175, filed on Feb. 12, 2019, and claims benefit of U.S. Provisional Application No. 62/629,851 filed Feb. 13, 2018, the content of which are herewith incorporated in their entirety.

TECHNICAL FIELD

The present disclosure relates generally to the use of poor quality sand such as desert sand/spherical sand and filamentous cellulose materials in concrete and mortar materials.

BACKGROUND OF THE ART

Fine aggregate (sand), coarse aggregate (gravel) and hydraulic binder (cement) are the main raw materials used for the production of concrete and mortar which when combined with water produce very common construction materials. Of these three raw materials, the aggregates—sand and gravel—make up the largest percentage of the primary material inputs (28.6 gigatons per year in 2010) and are the most extracted group of materials worldwide (Torres et al., 2017, Science, 357: 970-971). The sand is not homogeneous which is classified by shape, and has configurations from oblong, sharply angular to nearly spherical and smooth. Medium to coarse sand with rough surfaces and a sharply angular shape, such as river bank sand or costal sand grain are favorable for making concrete. Desert sand, on the other hand, is classified as fine sand with a nearly oblong, spherical shape and a smooth surface; it is considered unsuitable for using in concrete and cement, or banking up new land in the sea.

River sand or crushed sand from rock is the primary choice of fine aggregate for manufacturing concrete. However, river sand and beach sand, has been largely depleted due to the enormous demands for it by the construction industry worldwide. Marine sand dredging from beaches, islands and oceans can be used to make concrete but requires intensive washing to remove the high salt content in order to prevent the corrosion of the concrete, especially with steel reinforced concrete. Seafloor dredging creates extensive environmental damages and also causes choking sandstorms, the killing of organisms, the destruction of coral reefs and other habitats, and it alters the patterns of water circulation. In some extreme scenarios, over-exploitation of global supplies of sand is endangering communities and promoting violent conflicts for illegal sand dredging.

To overcome this river/angular sand shortage crisis, efforts in using desert sand as construction sand have been made worldwide. WO 84/02520 teaches a method of using quartz sand as raw materials to feed into a sintering at 1400-1650° C. which is then molded. The bodies obtained in this manner can be used as tiles, floor tiles, roof tile bricks and as other building materials. However, they do not offer a substitute for the fine-grained aggregates in concrete.

U.S. 2017/0152176 describes a method of using thermal treatment to melt desert sand to form intermediate thin plate products. The thin plates of the melted desert sand were then crushed to get a coarse surface and sharply angular gravel similar to the natural occurring river, marine sand or artificial crushed sand from stone. The desert sand was heated up to at least 1700° C. to the melting point of the desert sand. The desired result requires temperatures up to 1810° C. which is an approach that needs intensive energy consumption. U.S. 2017/0152176 also teaches a method to produce the melting temperature through the bundling of solar rays; however, the temperature cannot be adjusted accurately.

CN1062535 teaches a method of using desert sand for road construction, where a sodium silicate (water glass) containing sodium oxide ($Na_2O$) and silica (silicon dioxide, $SiO_2$) is used to replace cement as the paste to glue the desert sand aggregate. The admixture of water glass has to be heated up to 80° C. to obtain the necessary water resistant property.

WO 2011/132841 describes a curing material constituting of series of inorganic salts that bind soil, industrial waste, marine sand and desert sand. The curing salt includes magnesium chloride, sodium chloride, potassium chloride, calcium chloride, sodium sulfate, sodium triphosphate and sodium lignosulfonate.

DE202006012396 describes a method to produce polymer concrete with desert sand using up to 18% of synthetic resin such as polyester resin, methyl meth acrylic resins, epoxy resins or other reactive resins as binders with other chemical additives and co-accelerators. The polymer concrete is different from the conventional concrete used in building materials due to the high content of synthetic resin.

CN 105036651 and CN 105036652 each teach a method to use desert sand to replace part of the regular construction sand, while increasing the cement requirement to ensure the bonding between the cement and sand aggregate. Fly ash and water reducing agents were also used in the cement/concrete mixes described.

CN 106699218 describes a method of using desert sand, cement, gypsum, calcium oxide (quicklime) and a foaming agent to mix with water. The admixture was molded and hardened for a certain period of time. The hardened brick is then cured with pressured steam to form a concrete brick for construction application.

In order to develop superior mechanical performance and durability concrete composites, efforts have been made to incorporate nanosized (nanometal oxides, nanoclay, carbon nanofibers and carbon nanotubes, etc.) objects into concrete to manipulate its nanostructure and control its macro behavior.

There is still a need to be provided with methods that offer an economical, mass-producible and environment friendly solution to meet the world demand for high quality construction sand requiring a sharp angular shape with rough surfaces. There is further a need to be provided with a means to use the enormous volume of desert sand available for concrete production, for the use in the recovery of new land, and for production of high quality concrete with low quality sand.

SUMMARY

In accordance with one aspect, there is provided a concrete composition comprising a hydraulic binder; a sand with a fineness modulus below 2.9; and a filamentous cellulose.

In an embodiment, the sand has a fineness modulus below 2.11.

In a further embodiment, the sand is a desert sand or a Ottawa sand.

In another embodiment, the desert sand is Yellow desert sand, Dune sand, Qatar desert sand, Gobi desert sand, Red desert sand, Black desert sand, or a combination thereof.

In a further embodiment, the filamentous cellulose is a cellulose filament (CF), cellulose nano filament, a cellulose nanofibril (CNF) or a microfibrillated cellulose (MFC).

In an embodiment, the filamentous cellulose an average length up to about 2 mm, and an average width from about 3 nm to about 500 nm.

In another embodiment, the hydraulic binder is selected from the group consisting of a Portland cement, a high alumina cement, a lime cement, a kiln dust cement, a high phosphate cement, a ground granulated blast furnace slag cement, a fly ash, a lime, a gypsum and combinations thereof.

In a particular embodiment, the hydraulic binder is a Portland cement.

In an embodiment, the filamentous cellulose to hydraulic binder is in a weight of less than 5% by weight of the hydraulic binder.

In another embodiment, the filamentous cellulose weight % to the hydraulic binder is in a range from 0.05% to 2.5% by weight.

In an embodiment, the composition described herein further comprises a coarse aggregate.

In an embodiment, the coarse aggregate is gravel, coarse, silicate, a clay, a metal oxide, a metal hydroxide, or a mixture thereof.

In an alternative embodiment, the coarse aggregate is in a range of average particles sizes of about 5 mm to about 40 mm.

In an embodiment, the composition described herein further comprises a sand with a fineness modulus over 2.9.

In another embodiment, the sand with a fineness modulus over 2.9 is a natural sand.

In an embodiment, the natural sand is a river sand, a river bank sand, a beach sand, or a combination thereof.

In another embodiment, the sand with a fineness modulus over 2.9 is a Lafarge sand.

In an embodiment, the composition is a concrete/mortar mix, a concrete mix, a mortar mix, a mortar composition, or a concrete/mortar sand adhesion additive.

It is further provided a method preparing concrete composition comprising providing a hydraulic binder, providing a sand with a fineness modulus below 2.9; providing a filamentous cellulose, and mixing the hydraulic binder, the desert sand, and the filamentous cellulose, wherein the filamentous cellulose creates a network adhering to the hydraulic binder and the sand.

In an embodiment, the method described herein further comprises adding a coarse aggregate.

In an embodiment, the method described herein further comprises admixing in addition a sand with a fineness modulus over 2.9.

In another embodiment, the method described herein further comprises curing and casting the concrete composition

DESCRIPTION OF THE DRAWINGS

Reference is now made to the accompanying figures.

DETAILED DESCRIPTION

Figure 1:
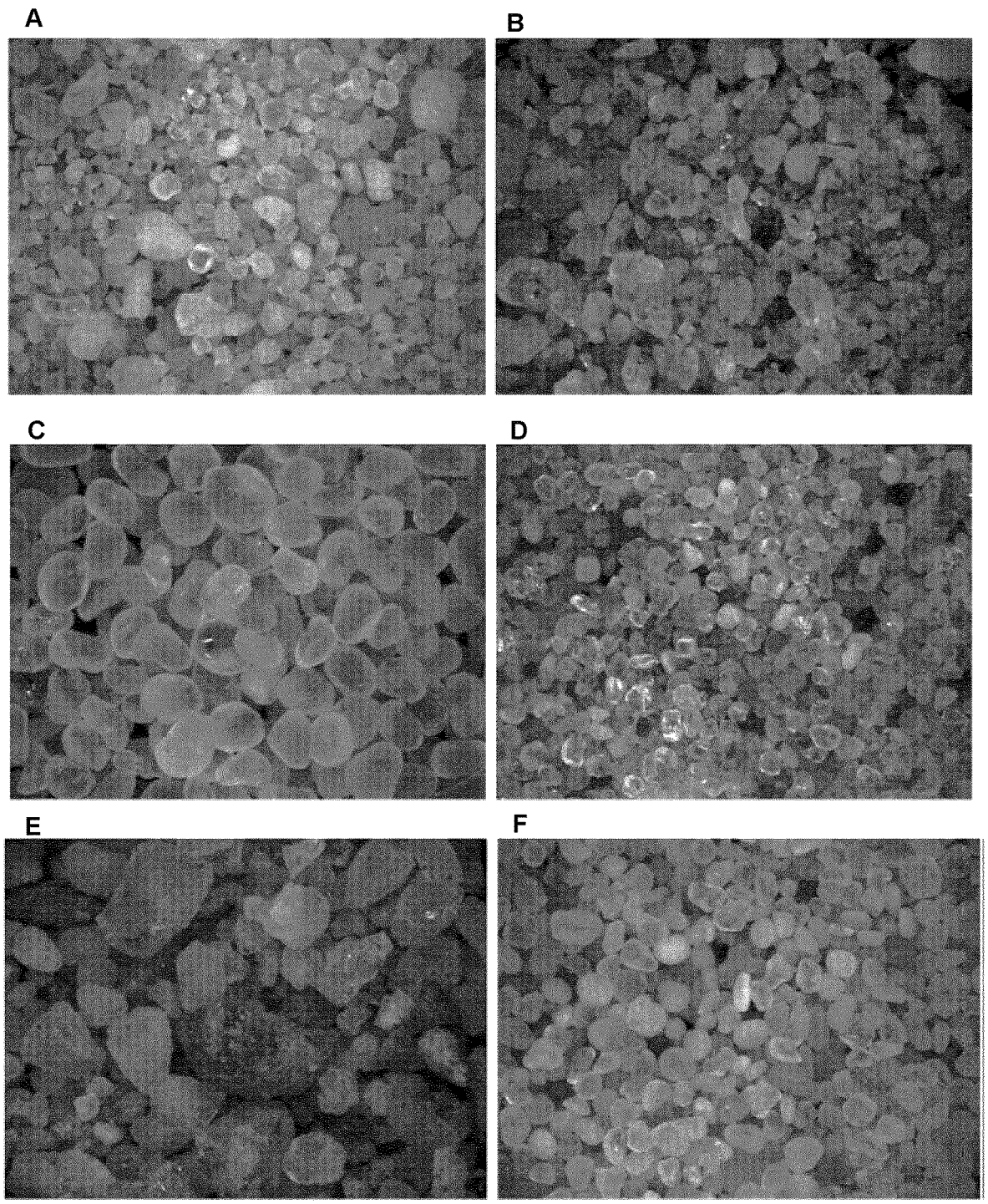
FIG. 1 illustrates optical micrographs of sand from different sources with magnification of 25× (A) Yellow desert sand, typically from Gobi, Sahara, Kara-kum, Thar, Dasht-e-Lut, Arabian and Mojave deserts; (B) River sand; (C) Ottawa sand; (D) Dune sand; (E) Lafarge construction sand; (F) Qatar desert sand; (G) Gobi desert sand; (H) Red desert sand, typically from Australian, Namib, Kalahari, Madagascar Spiny, and Sonoran deserts; and (I) Black desert sand, from Kalahari, Kara-Kum, Sechura, Pacific and Indian Ocean Island deserts.
Figure 1:
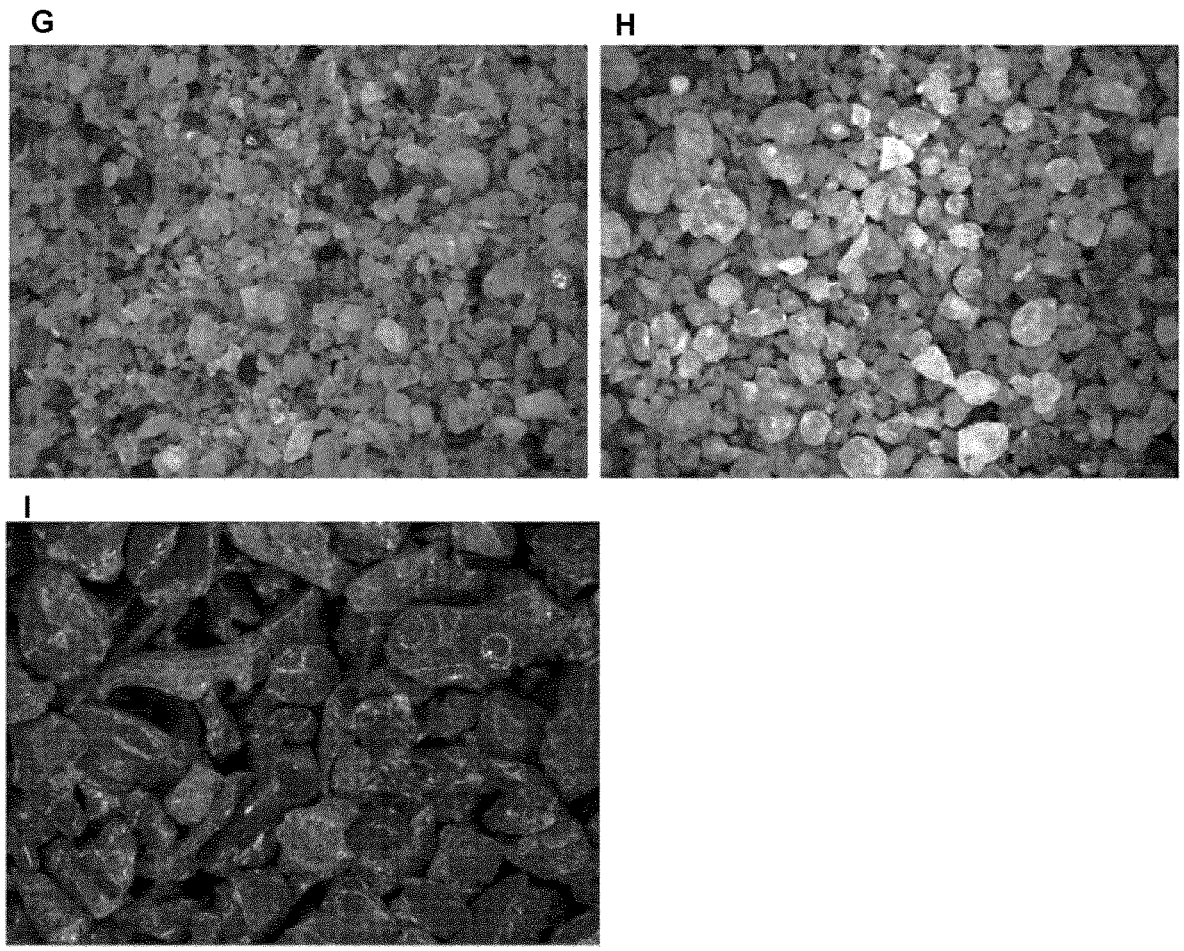

It is provided herein the use of poor quality sand such as desert sand/spherical sand and filamentous cellulose materials in concrete and mortar materials.

It is provided a concrete composition comprising a hydraulic binder; a sand with a fineness modulus below 2.9; a coarse aggregate and a filamentous cellulose.

Accordingly, it is demonstrated herein that the desert sand binds with cement and cellulose filaments (CF), cellulose nano filament, cellulose nanofibrils (CNF) and microfibrillated cellulose (MFC) to produce concrete, thus using a substituent like filamentous cellulose nano materials which are environment friendly and abundant.

Prior to the present disclosure, no cellulose filament (CF), cellulose nanofibrils (CNF) and microfibrillated cellulose (MFC) were used as an additive for making concrete from low quality sand like desert sand.

It is thus provided the use of cellulose filaments (CF), cellulose nanofibrils (CNF), microfibrillated cellulose (MFC), and cellulose in concrete and mortar, and more particularly, it is disclosed a concrete/mortar mix, a concrete/mortar composition comprising desert sand/spherical sand and filamentous cellulose materials. As described herein, the use of cellulose filaments (CF), cellulose nano filament, cellulose nanofibrils (CNF), microfibrillated cellulose (MFC), and cellulose prevent the sliding of individual sand grains against one another and therefor similarly contributes to the stabilization of the building materials.

The use of cellulose nanofiber as modifier for rheology, hydration kinetics and mechanical performance was reported (Sun et al., 2016, Scientific Reports, 6: 31654; Jiao et al., 2016, PLOS ONE D01:10.1371/journal.pone.0168422). Hisseine et al. (2018, Journal of Materials in Civil Engineering, 30(6)) discovered that the cellulose filament has adversely affected the compressive strength of cement paste where it was believed that the air was entertaining into the cement paste with addition of cellulose filament, but improved the compressive strength and flexural capacity in self-consolidating concrete (SCC), mainly due to the nanoreinforcing and internal curing. Cao et al. (2015, Cement Concrete Composites, 56, 73-83) reported an increase in water and superplasticizer demands by adding CNC (cellulose nanocrystal) into concrete mix and improved flexural strength of 20-30% at an optimum CNC dosage of 0.2% by weight due to an enhanced hydration degree and decrease in workability by adding CNC. Peters et al (2010, Transportation Research Record Journal of the Transportation Research Board, 2142: 25-28) found that a NFC addition of 0.5% by weight for improving the fracture properties of ultrahigh-performance concrete. Onuaguluchi et al. (2014, Construction and Building Materials 63:119-124) reported an increase in flexural strength of cement pastes containing 0.1% by weight NFC by approximately 106%.

JP 2013-188864 describes a method to add nanofibers into highly concentrated concrete paste using a dry injection moulding process. To help the dispersion of nanofiber in cement molded body, support medium powder was introduced to carry the nanofiber, where the ratio of nanofiber verse support medium power varied from 3.33-6.67%, and organic solvents such as alcohol were utilized to help the dispersion of nanofiber into the dry cement molding mix. The ratio of nanofiber in the final mixture was less than 1% and the preferable ratio of nanofiber was around 0.1% in mass. The aspect ratio of nanofiber in this patent was around 100. It was discovered that the mechanical strength of the dry mixed molding of final concrete was improved only ~14% by adding nanofiber into the formulation.

U.S. Pat. No. 9,174,873 describes a method using microfibrillar cellulose as additives for concrete admixtures. The function of microfibrillar cellulose in the concrete admixtures was to modify rheology or control segregation of cementitious composition admixtures to influence the wet formulations. The water ratio verse cement (W/C) in these admixtures ranged from 0.35 to 1.0. The used amount of microfibrillar cellulose was very low, between 0.002% and 0.2% by weight of the cementitious binder in the cementitious composition and optionally water.

Compared to prior disclosure, it is provided a method to make concrete using low quality sand, e.g. desert sand, from different area of the world, by adding cellulose micro/nano materials. It is described herein an economical and environment friendly method to make the enormous volume of sand in deserts available both for the production of concrete and also for the use to recover new land.

A particular advantage of the method described herein relates to preventing the sliding of individual sand grains against one another and therefore similarly contributes to the stabilization of the construction material. It is described herein a method in the area of construction chemistry that uses a plant derivate of filamentous cellulose, such as, cellulose filament (CF), cellulose nanofibrils (CNF) and microfibrillated cellulose (MFC) to contribute to anchoring the smooth surface of the spherical sand, thus the filamentous cellulose provides a new adhesion binding chemistry amongst the plant derivate cellulose and round fine desert sand, allowing banking up the spherical sand for land recovery in the sea.

Advantageously, the use of CF, cellulose nano filaments, cellulose nanofibrils (CNF) and microfibrillated cellulose (MFC) as described herein provides appropriate adhesion between the hydraulic binder or cement paste and the weathered rounded fine desert sand. Surprisingly, the presence of CF, cellulose nano filaments, cellulose nanofibrils (CNF) and microfibrillated cellulose (MFC) improves the adhesion of interfacial transition zone (ITZ), which exists in the cement paste near aggregate, such as sand particles and rocks in concrete.

In an embodiment, small amount (≤5%) of CF, cellulose nano filaments, cellulose nanofibrils (CNF) and microfibrillated cellulose (MFC) is added to impact the adhesion between the cement particles and fine desert grains. Thus it is described herein an economical approach to make the enormous volume of sand in the deserts available for the production of concrete/mortar.

A further advantage of the method provided herein is the simplicity of mixing or dispersing the CF, cellulose nano filaments, cellulose nanofibrils (CNF) and microfibrillated cellulose (MFC) into the water prior to the mixing of the concrete mix described herein comprising desert sand, cement, gravel aggregates and other admixtures additives, such as water reducing agents, superplasticizers, fly ashes, etc.

Definitions

As encompassed herein, a concrete composition is understood to mean composition comprising a hydraulic binder, a sand with a fineness modulus of below 2.9, and a filamentous cellulose. Accordingly, the concrete composition described herein can be a concrete/mortar mix, a concrete mix, a mortar mix, a mortar composition, a concrete/mortar sand adhesion additive, as described herein. Particularly, a concrete composition as described herein can comprise lower water to hydraulic binder ratio than mortar. Concrete includes coarser aggregate (gravel or chipped rock) that provides greater strength and durability to the concrete over that of mortar.

A mortar/concrete mix is understood to be a mixture of dry components of a mortar/concrete composition. The main dry components of the mixtures are understood to be a hydraulic binder (cement), an aggregate, that is understood to be at least cement, fine aggregate (sand), and both fine aggregate and coarse aggregate (gravel) and optionally, concrete admixture chemicals.

A mortar/concrete composition is understood to be the mortar/concrete mixture with water providing a working mortar or a working concrete that hardens to a mortar and a concrete, respectively.

A mortar composition is further understood as a thick pasty mixture of water, generally a fine aggregate and hydraulic binder (cement) that upon hardening is used to hold building materials together. The water to hydraulic binder (cement) ratio in mortar is higher than in concrete.

A hydraulic binder is understood to be the portion of the concrete or mortar composition that hardens upon addition of water with a hydration reaction. The terms "hydraulic binder" and "cement" are used herein as synonyms and include but are not limited to: Portland cement, high alumina cement, lime cement, kiln dust cement, high phosphate cement, ground granulated blast furnace slag cement fly ash, lime and gypsum. A chemical reaction occurs upon addition of water to change the mineral structure of the binder.

An aggregate is understood to account for 60 to 85% of the volume of a concrete and is understood to include sand, gravel and crushed minerals in a natural or processed (crushed) form i.e. that derives from quarries. Large rocks are crushed and sieved, with the sand and gravel produced being particularly applicable for concrete and mortar. A fine aggregate is understood to be a natural sand or crushed stone with most particles being no larger than 5 mm. The particle's shape and size, as well as the surface texture of sand may have a considerable influence on the quality of the concrete, either fresh or in the hardened state. Herein distinct types are considered. The first fine aggregate is sand that derives from rivers (banks), beaches (washed to remove salt), or from crushing operations. This first category of sand is considered appropriate for concrete production because they have broader sizes, coarser surfaces and fractured shapes that are sharply angular. The second category of fine aggregate disclosed here, is desert sand that generally has a finer particle size than river and beach sand, and has a weathered non-angular surface and rounded shape but it may include, and is not limited to, any other type of natural occurring fine and smooth silicate, or mixtures thereof. Desert sand has previously been understood to be unsuitable for concrete and mortar due to the smooth surface and round shape, as well as the narrow size distribution.

FIG. 1 is the optical micrograph of sand from different sources, which include Yellow desert sand, Ottawa sand, Dune sand from Oregon State, US, Lafarge construction sand supplied from St-Gabriel (QC, Canada) quarry of Lafarge, Qatar desert sand, Gobi desert sand, Red desert sand and Black desert sand. The microscope characterization of the different sands shows that the geometry difference of sand from different sources. It can be observed that all desert sands from different locations, as well as dune sand and Ottawa sand, are relatively round rather than a sharp angular shape and their surface is smooth, while river sand and Lafarge sand from construction quarry are more angular with a rough surface. "Spherical sand" is understood to be synonymous with desert sand and also has a round shape, it is not angular, nor square, nor triangle, nor irregular in shape as described in the World Atlas of Sands.

Figure 2:
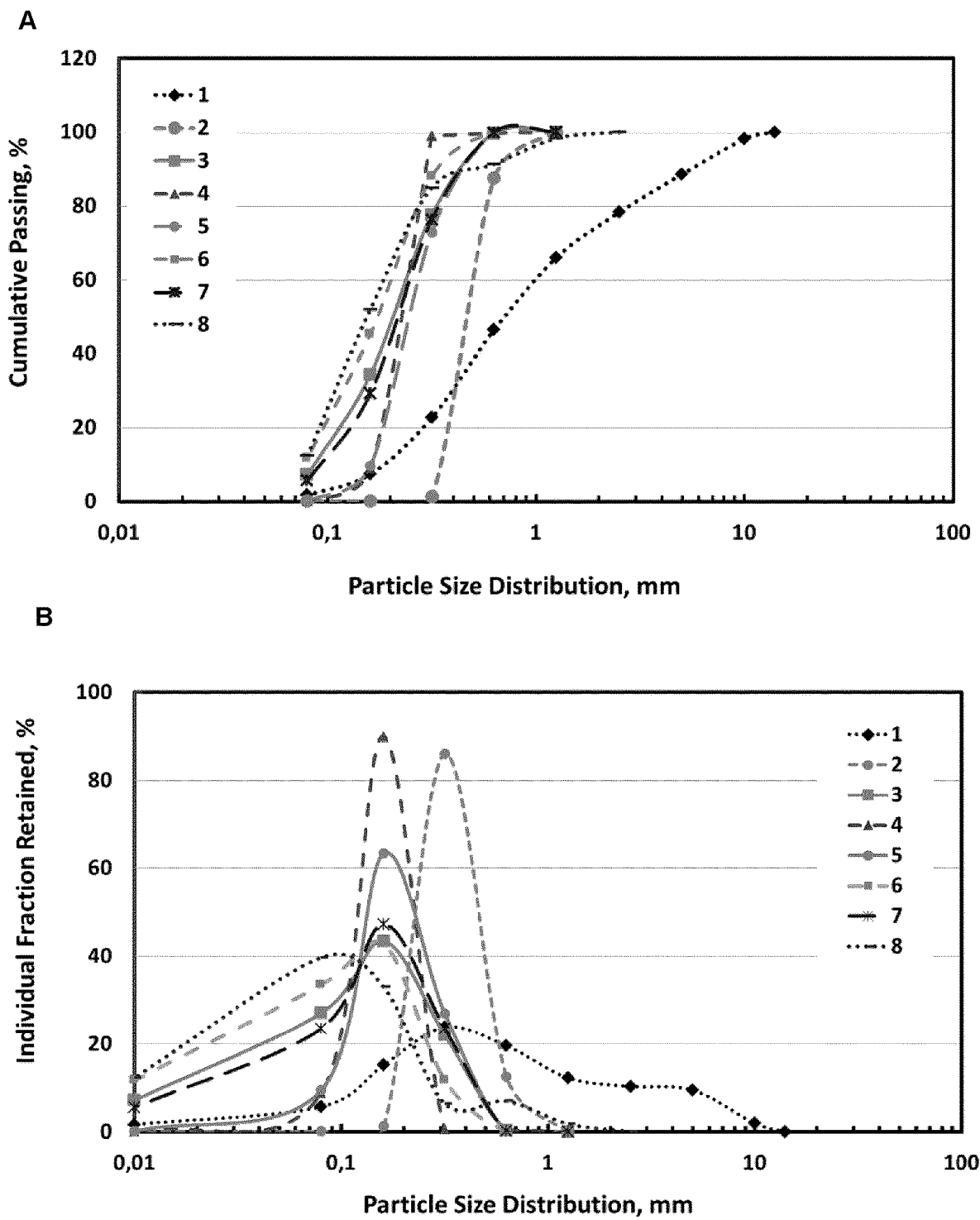
FIG. 2 are sieve analysis of sand according to (ASTM C136-01), showing in (A) Cumulative percent passing vs. particle size and in (B) individual fraction retained vs particle size, wherein 1: Lafarge construction sand; 2: Ottawa sand, 3: Yellow desert sand; 4: Dune sand; 5: Qatar desert sand; 6: Gobi desert sand; 7: Red desert sand, and 8: Black desert sand.

All the sands were sieved and classified according to ASTM C 136-01 (Standard Test Method for Sieve Analysis of Fine and Coarse Aggregates). The results are summarized in Table 1, where the fineness modulus of sands are varied from 2.93 (Lafarge sand), 2.11 (Ottawa sand), 0.88 (Yellow desert sand), 0.93 (Dune sand), 1.18 (Qatar desert sand), 0.67 (Gobi desert sand), 0.95 (Red desert sand) and 0.74 (Black desert sand). According to the ASTM standard specification, only Lafarge sand qualifies for use as construction sand and thus a sand with a fineness modulus below 2.9 is unqualified. The fineness modulus of the other types of sand is way off from the Standard specification. FIG. 2A shows the cumulative percent passing vs the particle size distribution, where it can be clearly observed that 100% Ottawa sand and other types of dune and desert sands can pass through the sieves of 1.25 mm, which the size is much smaller than Lafarge sand. FIG. 2B shows the individual fraction of sand particle size distribution, where it can be observed that Lafarge construction sand has much wider distribution (sand grading), Ottawa sand and Dune sand have much narrower size distribution, whereas Yellow desert sand, Qatar desert sand and Gobi desert sand are finer, which indicates that they are of very poor quality for use in making concrete.

TABLE 1

Sieve Analysis of Fine Aggregate (ASTM C136 -01)

% Individual Fraction Retained

| Sieves, mm | Lafarge sand | Ottawa sand | Yellow desert sand | Dune sand | Qatar desert sand | Gobi desert sand | Red desert sand | Black desert sand |
|---|---|---|---|---|---|---|---|---|
| 20 | | | | | | | | |
| 14 | 0 | | | | | | | |
| 10 | 1.9 | | | | | | | |
| 5 | 9.5 | | | | | | | |
| 2.5 | 10.3 | | | | | | | 0 |
| 1.25 | 12.2 | 0.0 | 0.0 | 0.0 | 0.0 | 0.0 | 0 | 2 |
| 0.630 | 19.6 | 12.5 | 0.3 | 0.4 | 0.1 | 0.2 | 0 | 7 |
| 0.315 | 23.8 | 86.1 | 22.1 | 0.7 | 27.0 | 11.8 | 24 | 6 |
| 0.160 | 15.2 | 1.3 | 43.4 | 90.0 | 63.3 | 42.8 | 47 | 33 |
| 0.080 | 5.7 | 0.1 | 27.1 | 8.8 | 9.5 | 33.5 | 23.5 | 39.7 |
| Pan | 1.7 | 0.1 | 7.2 | 0.1 | 0.2 | 11.7 | 5.57 | 12.3 |
| Fineness MODULUS: | 2.93 | 2.11 | 0.88 | 0.93 | 1.18 | 0.67 | 0.95 | 0.74 |

A coarse aggregate is understood as a gravel rock, but it also includes natural occurring or crushed coarse and angular silicate, and is not limited to, any other type of silicate, clays, metal oxides or hydroxides, or mixtures thereof. The coarse aggregate generally has a particle size starting at about 5 mm to about 40 mm for structural applications. Larger aggregates up to 150 mm are used in massive concrete dam projects.

The term "filamentous cellulose" is understood as a cellulose that is formed of slender threads or filaments, and is understood to include cellulose filaments (CF), cellulose nano filaments, cellulose nanofibrils (CNF) and microfibrillated cellulose (MFC), and combinations thereof, where the filamentous cellulose comprises an average length up to about 2 mm, and an average width from 3 nm to about 500 nm.

The terms "cellulose filaments" or "CF" and the like as used herein refer to filaments obtained from cellulose fibres having a high aspect ratio, for example, an average aspect ratio of at least about 200, for example, an average aspect ratio from about 200 to about 5000, an average width in the nanometer range, for example, an average width from about 30 nm to about 500 nm and an average length in the micrometer range or above, for example, an average length above about 10 µm, for example an average length from about 200 µm to about 2 mm. Such cellulose filaments can be obtained, for example, from a process which uses mechanical means only, such as for example, the methods disclosed in U.S. 2013/017394, the content of which is incorporated herein by reference. For example, such method produces cellulose filaments that can be free of chemical additives and free of derivatization using, for example, a conventional high consistency refiner operated at solid concentrations (or consistencies) of at least about 20 wt %. These strong cellulose filaments are, for example, under proper mixing conditions, re-dispersible in an aqueous medium. For example, the cellulose fibres from which the cellulose filaments are obtained can be but are not limited to Kraft fibres such as Northern Bleached Softwood Kraft (NBSK), but other kinds of suitable fibre are also applicable, the selection of which can be made by a person skilled in the art.

The term "carrier" defines a fibre that is generally natural and in a preferred embodiment of a pulp fibre. The pulp may derive from wood or other plants, and may be mechanical pulps, such as CTMP, TMP or BCTMP or chemical pulps, such as NBSK.

The term "physically attached" with respect to the filamentous cellulose is used herein by reference to the bond between the re-dispersible cellulose filament and the carrier.

The term "dry" as defined herein in reference to the filamentous cellulose described herein refers to a solid content of the mixture of cellulose filaments and natural fibres being no less than 70% by weight solids, or a moisture content of no more than 30% by weight. In a particularly preferred embodiment the solids content of the mixture of cellulose filament and natural fibres is no less than 80% by weight solids, or a moisture content of no more that 20% by weight.

The term "water re-dispersible" as defined herein refers to the ability of the dried cellulose filaments to form a stable water dispersion upon mechanical agitation in an aqueous medium at ambient or an elevated temperature.

The term "free of additives" is used herein to describe CFs that have not been treated with additives to reduce hornification. The additives that are used with other cellulose fibril include sucrose, glycerin, ethylene glycol, dextrin, carboxymethyl cellulose or starch (U.S. Pat. No. 4,481,076).

The term "consistency" is defined with respect to the filamentous cellulose herein as the weight percentage of plant fibres or cellulose filaments (CF) in a mixture of water and, plant fibres or cellulose filaments (CF).

The term "basis weight" is defined herein with respect to the filamentous cellulose, as the weight in grams (g) of sheets of pulp fibres and CF per square meter (m$^2$) of the said sheets.

A weight that is oven-dried (od) basis with respect to the filamentous cellulose refers to the weight that excludes the weight of water. For a moist material such as CF, it is the water-free weight of the material that is calculated from its consistency.

Therefore the cellulose nano filament is understood to be "cellulose filament (CF)" produced by multi-pass, high consistency refining of wood or plant fibers such as a bleached softwood kraft pulp (U.S. 2013/017394). Other kinds of suitable fibers are also applicable for use with beach sand and hydraulic binder in concreted, the selection of which can be made by a person skilled in the art.

The term "cellulose filament" or "CF" used herein are understood to be synonymous with "cellulose nano filament" and are those produced in a wet form at a consistency between 20%-60% and transported in such a wet form using an impervious bag. CF also includes dry rolls of or shredded films of cellulose filaments made on paper machines as described in CA 2,889,991 or WO2014/071523 A1 both of which are herein incorporated by reference. CF-containing pulp refers to the dry and water re-dispersible mixture of CF and pulp fibers as described in US2016/0319482 A1, hereby incorporated by reference. The CF used herein preferably has an average length from about 200 µm to about 2 mm, an average width of from about 30 nm to about 500 nm and an average aspect ratio of from about 200 to about 5000. The CF is dispersed or dispersible in water and then added to the concrete mix.

The term "cellulose" is understood as a naturally occurring polymer from a plant, such as wood, obtained by pulping or other processes and methods.

An admixture is defined herein as further ingredients that go into concrete mixes and compositions that are other than the hydraulic binder, aggregate and water. In the present description an admixture excludes the cellulose nano filaments described herein. Admixtures chemicals/additives are most often: air entraining agents, water reducing agents, superplasticizers, fine minerals (silica fume) or products meant to accelerate or retard the hydration reaction of the hydraulic binder with water.

The desert sand concrete according to the present disclosure comprises cellulose filaments (CF) and/or CF-containing pulp, cellulose nano filaments, cellulose nanofibrils (CNF) and microfibrillated cellulose (MFC), a hydraulic binder, desert sand, and/or silicate sand (fine aggregate), and/or gravel aggregates, and/or fly ashes, and/or water reducing agents, and/or other admixture additives. As previously described the CF, cellulose nanofibrils (CNF) and microfibrillated cellulose (MFC) acts to link the cement and desert sand, and thereby provide appropriate adhesion between the fine desert sand, cement and aggregates. Surprisingly, the addition of CF, cellulose nano filaments, cellulose nanofibrils (CNF) and microfibrillated cellulose (MFC) provides appropriate adhesion in different forms to anchor the cement particles and desert sand, thus to hold the binding agent (cement particles), desert sand and aggregate together to form a composite entity. The dried and cured composite entity consisting of cement, desert sand, and/or aggregate and CF, cellulose nanofibrils (CNF) and microfibrillated cellulose (MFC) provide necessary mechanical strength for the desert sand concrete. The cement ratio of a desert sand concrete mix can be varied from 15-40%, preferably in the range of 15-30%. The desert sand can fully or partially replace the coarse and angular sand from river/beach or crushed stone. Gravel aggregates, fly ashes, air entraining agents, water reduce agents and other additives can be added into the admixture to make desert sand concrete with CF, cellulose nano filaments, cellulose nanofibrils (CNF) and microfibrillated cellulose (MFC).

An interfacial transition zone (ITZ) is defined herein as an area which exists in the cement paste near aggregate (sand particles and rocks) in concrete and is considered as a (at least) three-phase composite: (1) bulk cement paste, (2) ITZ cement paste, and (3) rock and sand, collectively called aggregates. The median diameter of cement grains in common use is around 10-30 micrometers, which is much smaller than the average aggregate diameter. A region of higher porosity near the aggregate surface will appear when the cement grains encounter the aggregate due to the "packing" constraints imposed by the aggregate surface. Thus the ITZ is normally the weak area of concrete composites. In the case of desert sand aggregate, cement particles alone can't provide enough adhesion to hold the desert sand aggregate together.

Compared to the natural sand from rivers/beaches or crushed sand (each of which have coarse fractured surface and are sharply angular), desert sand has always been considered unsuitable for making concrete because desert sand has a weathered non-angular surface and rounded shape (see FIG. 1), and fine sand with narrower size distribution (FIG. 2) than the river sand. What has been traditionally used as sand for concrete has always required a wider particle size distribution, a shape with angular edges that provides a proper surface for bonding between the binder cement paste and the sand grains.

A flow table test is a method to test the consistency of fresh concrete/mortar. The flow table test procedure used herein was adapted from the mechanism of flow table test European Standard BS EN 12350-5: 2000, which is similar to the ASTM standard C 1611-05 of slump-flow test with the apparatus illustrated in FIG. 3. The steps of the adapted test presented herein are as follows: a cement paste/mortar is prepared; the flow table test set-up was formed with a flat plastic table and a steel cylinder mold with an inner diameter of 5.1 cm and a height of 5.1 cm (total volume 104 cm$^3$) with the lifting and dropping procedures which is similar to the standard method. The fresh mixed paste/mortar mixing was filled into the cylinder, before lifting the mold, excess concrete is removed, the surrounding table top is cleaned, and after an interval of 30 sec, the mold is slowly removed. In consequence, the fresh paste/mortar spreads and the maximum spread diameters on the table are measured. While the test method used is not a standard test and it does incorporate features from the conventional approaches encompassed by the standards, the test provides useful information to understand how the samples compared in terms of uniform and cohesive. If the cohesion of the paste/mortar sample tested was found to be insufficiently thick and an overly wide spread diameter was obtained, the paste/mortar sample obtained will not have the desired quality once it set, and particularly the desired strength. Mortar should at this stage appear uniform and cohesive or else the test is considered inappropriate for the given mix. Thus the test offers an indication of the cohesiveness of the mix.

The flow table test procedure simulates the standard flow table set-up at a smaller scale and measures the fluidity of the cement pastes/mortar with different sands, water/cement ratio, with/without CF, cellulose nanofibrils (CNF) and microfibrillated cellulose (MFC) and different dosages of CF, cellulose nanofibrils (CNF) and microfibrillated cellulose (MFC). The present test is used to establish a qualitative comparison of the mortar mixed described herein.

Figure 3:
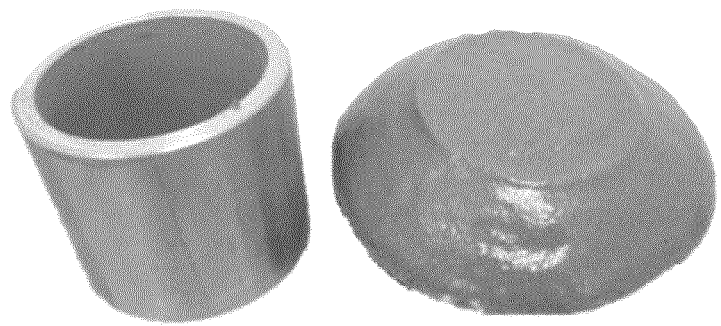
FIG. 3 is a photograph of a flow table test set-up with a metal cylinder (on the left, dimension 5.1 cm diameter×5.1 cm height, volume 104 cm$^3$) used in testing and a concrete composition sample on the right side according to one embodiment, wherein the concrete admixture in this picture consisted of cement, desert sand and 0.3% CF vs. the ratio of cement binder, where the water/cement (W/C) ratio is 1 and the sand/cement (S/C) ratio is 2.

Different mortar mixes were prepared including those with desert sand, cement and water with and without the cellulose nano filaments. The ingredients were mixed together and the fluidity of the mortar mixture was measured with the flow table test set-up as previously described and as indicated in FIG. 3. Observation led to the conclusion that the individual desert sand grains slide from the cement paste and against one another when no cellulose nano filaments were present.

Figure 4:
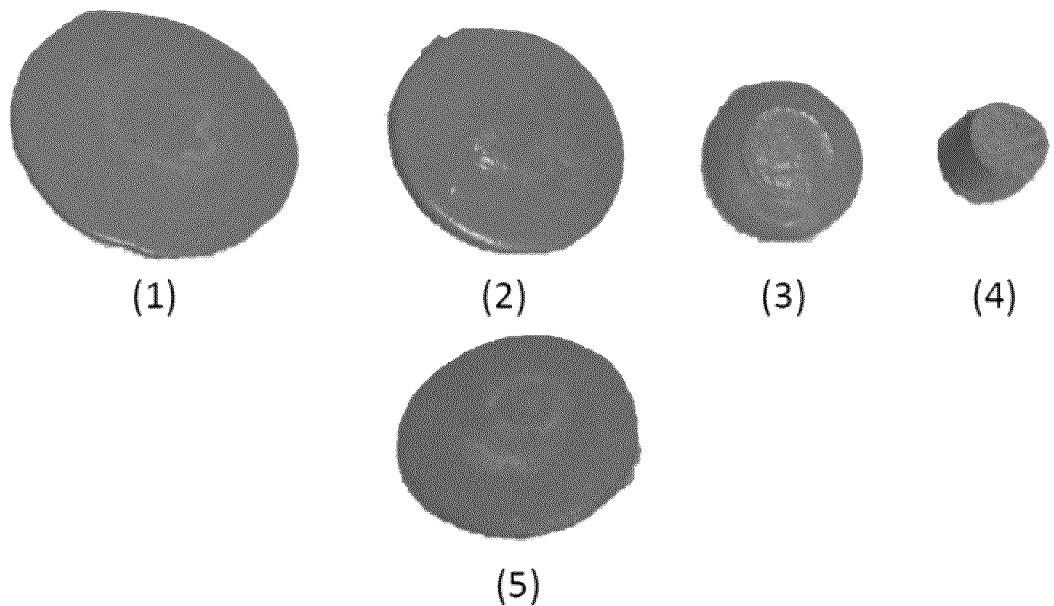
FIG. 4 is a photograph showing fluidity of cement and sand mortar at water/cement ratio of 1, sand/cement ratio of 2, where sample (1) was mortar made with Yellow desert sand (having a 21.3 cm diameter of fluidity); sample (2) was made from desert sand and 0.14% CF per cement (having a 15.5 cm diameter) according to one embodiment; sample (3) was made from Yellow desert sand and 0.275% CF per cement according to one embodiment; sample 4 was made with Yellow desert sand and 1.4% CF per cement according to one embodiment; and sample 5 was cement mortar made with river sand without CF (having a 15.1 cm diameter).

The samples of prepared mortar mixtures were permitted to produce a spread diameter on the flow table (FIG. 4). The spread diameter for a regular mortar composition with river sand is seen in FIG. 4 (sample 5). The conventional mortar composition had a water/cement ratio of 1 and a S/C ratio of 2 that is free of CF material produced a 15.1 cm diameter. Under the same conditions, the spread diameter of a mortar composition of desert sand, cement and water was 21.3 cm (sample 1).

As described herein, the cellulose filaments (CF) was mixed with water, cement and desert sand grain, and/or gravel aggregates, and/or other additives to produce concrete. Surprisingly, it has been discovered that the fluidity of the fresh mortar compositions (water/cement=1) of CF, cement and desert sand were changed dramatically by adding only 0.14% of CF (FIG. 4, sample 2), which is similar to the fluidity of the fresh mortar composition of cement with river sand at same water/cement ratio (FIG. 4, sample 5). The spread diameter of the fluidity of 0.14% CF composition with cement, desert sand was 15.5 cm, much smaller than the spread diameter of pure cement and desert sand composition of 21.3 cm. It is similar to the spread diameter 15.1 cm of the fresh mortar composition of cement and river sand (Table 2). Also unexpectedly, the fluidity of the composition of cement and desert sand are drastically reduced by increasing the dosage of CF to 0.3% (FIG. 4, sample 3). More surprisingly, after removing the metal cylinder, the fresh mortar composition of cement and desert sand remained a completely cylinder shape with only a slight slump when the CF dosage increased to 1.41% (FIG. 4, sample 4).

Figure 5:
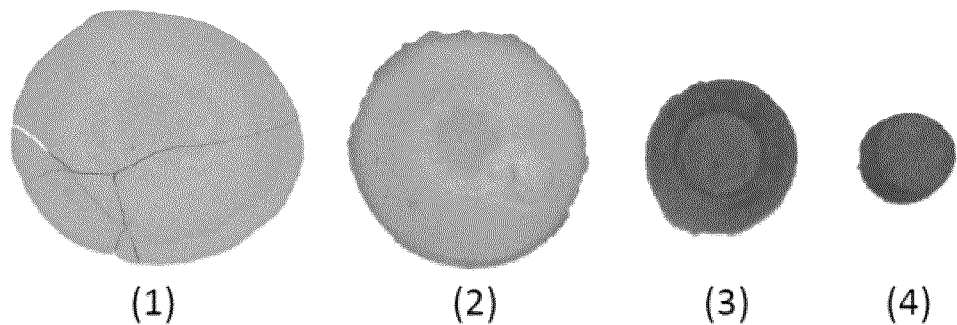
FIG. 5 is a photograph of dried mortar samples with desert sand from FIG. 4, where sample 1 is dried mortar made of Yellow desert sand showing cracks; samples 2, 3, 4 are the dried mortar samples made of Yellow desert sand with CF which retain their shapes with no cracks observed.
Figure 6:
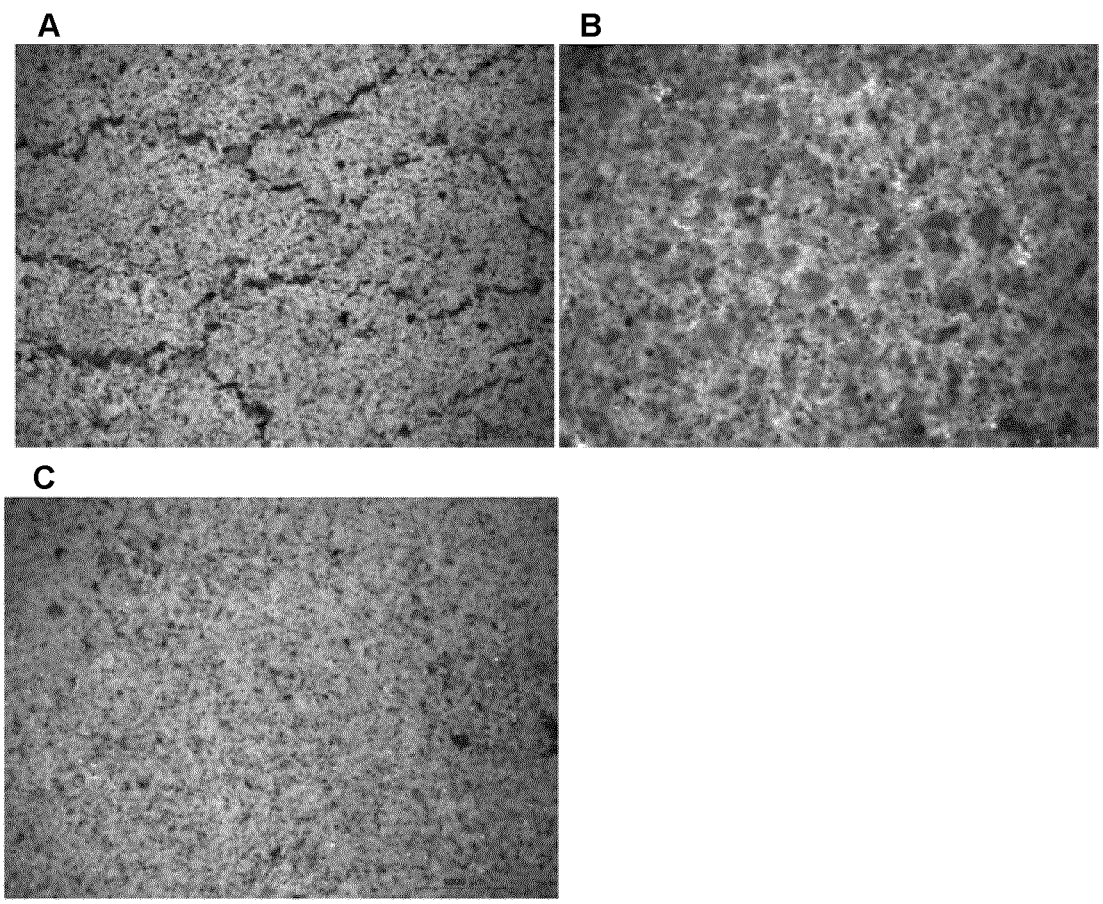
FIG. 6 are microscope pictures mortar sample with a magnification of 25×, W/C ratio of 1, wherein in (A) the sample was made with cement and Yellow desert sand free of cellulose filament, cracking was observed; in (B) the sample was made with cement, Yellow desert sand and 0.3% CF per cement according to one embodiment; and in (C) the sample is a dried mortar made with river sand.
Figure 7:
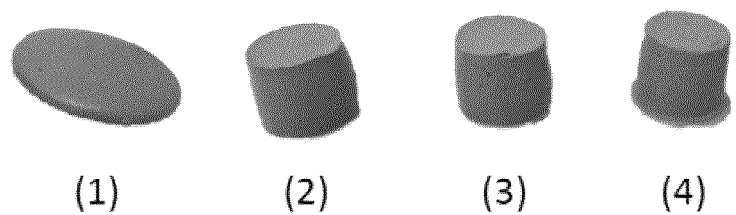
FIG. 7 is a photograph that shows four flow table test samples each prepared with a water/cement ratio of 0.63 and a sand/cement ratio of 2; wherein sample 1 was made from Yellow desert sand and free of cellulose filament; sample 2 was made from Yellow desert sand and 0.1% CF per cement according to one embodiment described herein; sample 3 was made from Yellow desert sand and 0.3% CF per cement according to one embodiment described herein; and sample 4 was made from Yellow desert sand and 0.70% CF per cement according to one embodiment described herein.

Surprisingly, the dried mortar made from desert sand without CF cracked, while the mortar mix with additional CF remained in the same shape as it was casted (FIG. 5), which indicates that the addition of CF provides adhesion amongst the binder cement particles and desert sand particles and anchors together the cement particles and aggregates. Accordingly, the micrograph (FIG. 6A) shows much cracking and micro-cracking from the surface to the bottom of the dried mortar composition of cement and desert sand. Accordingly, it's evident that there is not enough adhesion between the round fine desert sand and binder cement. Surprisingly, no cracking was found on the sample of dried mortar composition of cement, desert sand with 0.3% CF, which showed that the sand grains did not slide from each other (FIG. 6B). More surprisingly, the dried mortar composition of cement, desert sand and CF is similar to the dried mortar composition of cement and river sand (FIG. 6C). The addition of CF into the mortar composition contributes to the stabilization of the construction material. A similar trend was observed when the fresh mortar compositions were made with W/C of 0.63. After removing the metal cylinder, the mortar composition of cement and desert sand without CF had very little consistency and flowed out to a flat disc on the flow table. Meanwhile, the other mortar compositions bonded together and remained in a cylindrical shape without collapsing when CF was added into the fresh mortar compositions, indicating that the addition of CF anchors the cement pastes and desert sand together to form an entity. There are some differences with the slump levels with the change of CF dosage varied from 0.14%, 0.3% to 0.70% (FIG. 7).

A similar trend was observed when other types of CNF, MFC were added into the fresh mortar compositions. Two types of MFC and one type of CNF were mixed with the cement, desert sand compositions at 1.5% and 3% ratio, while the water/cement ratio is 1, desert sand/cement ratio is 2. The binding capacity of different MFC and CNF are comparable to CF (FIG. 8), which is significantly different than the composition at the same water/cement ratio, same desert sand/cement ratio without filamentous cellulose materials.

Figure 9:
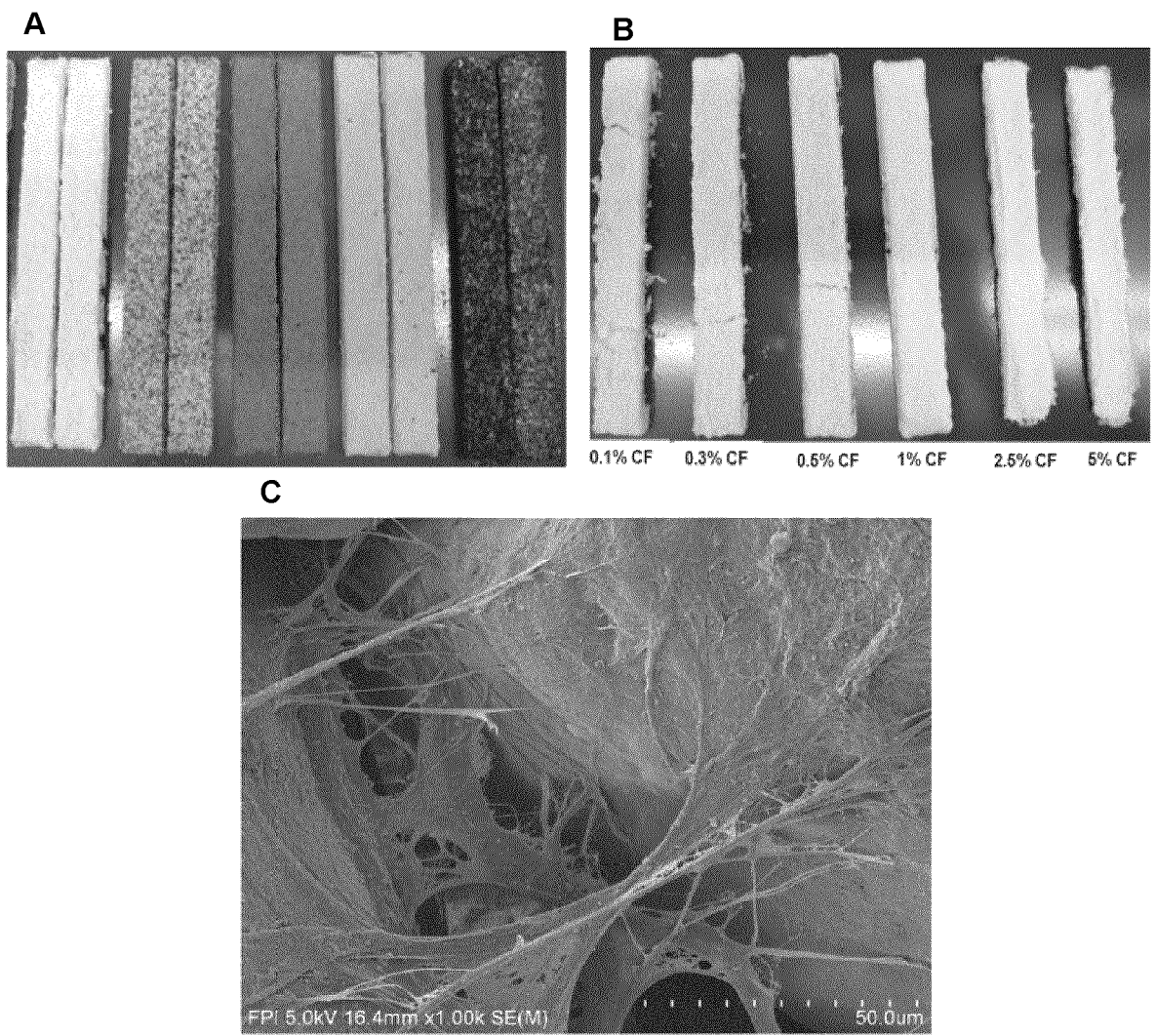
FIG. 9 represents different types of sand mix with CF (0.5% and 1%), wherein in (A) from left to right, Ottawa sand, River sand, Red desert sand, Yellow desert sand, Black desert sand; in (B) Ottawa sand bind with different ratio of CF, and in (C) microstructure with SEM characterization of Yellow desert sand with 1% CF, where it can be observed clearly that CF form a binding network on the surface of desert sand granule to prevent the sliding of individual sand grains against one another.

As seen in FIG. 9A, by mixing dispersed CF with different sand, surprisingly, it was observed that the CF can bind the sand together. When the mixture of CF and sand dried, the mixture stuck together, while the dried mixture became stronger with the increase of CF ratio (FIG. 9B).

Accordingly, the desert sand was mixed with dispersed CF (1.3%), and surprisingly, the desert sand was held together after drying. Unexpectedly, the SEM picture clearly revealed that CF adhering to the desert sand grain and forming a 3D network anchored to the surface of the desert sand granule (FIG. 9C). The binding between CF and desert sand provides a new adhesion chemistry amongst round fine desert sand to prevent the sliding of sand grains against each other, which makes it possible to bank up sand together for recovering new land in the sea.

Figure 10:
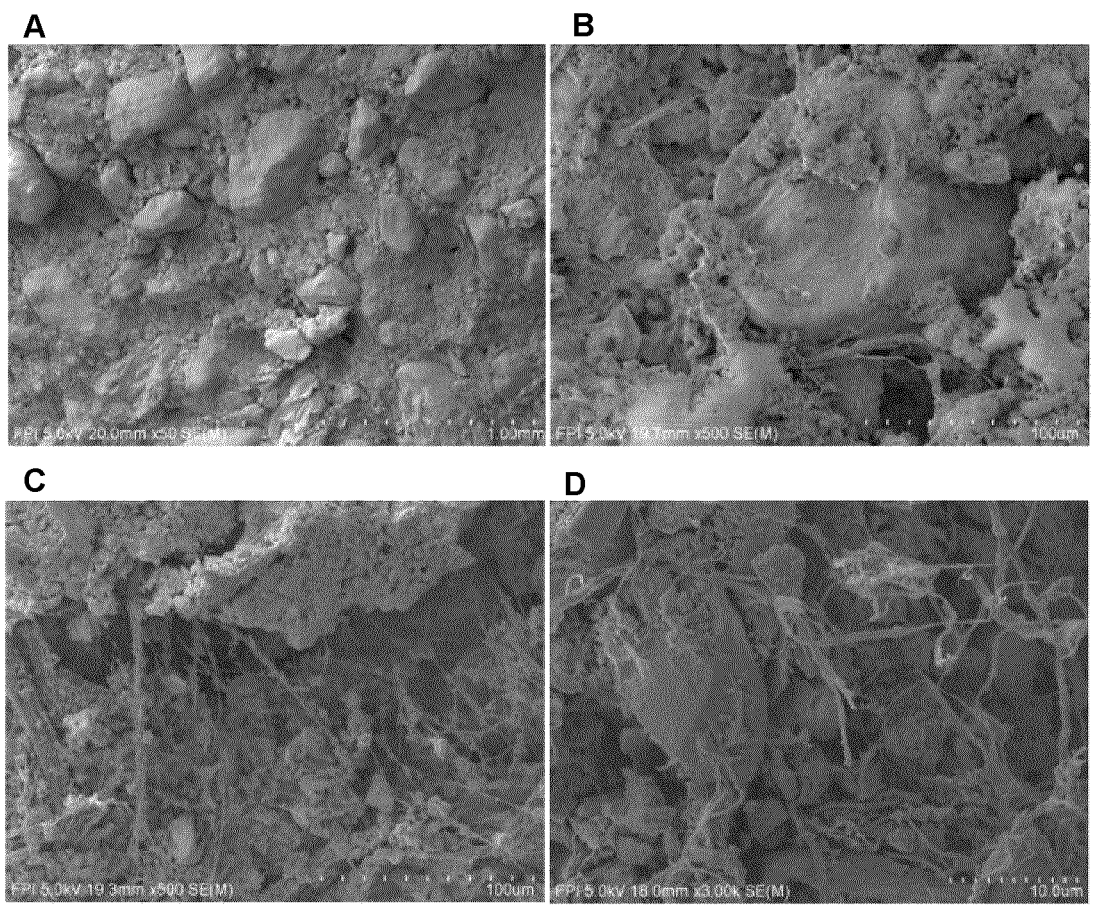
FIG. 10 are SEM photographs, showing in (A) cement desert sand mortar with poor adhesion between cement paste and sand grain; in (B) CF adhesion with cement and desert sand at the interphase interaction transition zone (ITZ); in (C) CF network in the mortar of cement and desert sand with 0.25% CF; and in (D) observation of CF (0.25%) provides appropriate adhesion to anchor the cement particles and desert sand to form a 3D network to hold the sand particles to prevent the sliding of individual sand grains against one another at interaction transition zone (ITZ).

Furthermore, as described herein, the presence of CF improves the adhesion at the interfacial transition zone (ITZ) amongst cement and sand aggregates. Accordingly, the microstructure of mortar made from desert sand cement mortar revealed that the binding was poor (FIG. 10A). Surprisingly, interwoven CF networks are observed in mortar mixture of cement, desert sand and CF (FIG. 10B). It can also be observed that the cement paste adhered on these CF networks. Furthermore, the desert sand grains are well held together by the cement particles and CF network as shown in FIG. 10C. Another type of bonding was also observed with CF adhesion in mixture with cement and desert sand at the interfacial transition zone as indicated in FIG. 10D. Most surprisingly, the SEM picture in FIG. 10D showed the CF adhering to cement paste forms a 3D network anchoring to the surface of the desert sand. Furthermore, the CF adhering to the cement particles and bonded to the desert sand surface entangles with other CF filaments to form a network and thereby produces strong adhesion that holds the desert sand grains, and contributes to prevent the sliding of the individual sand grains against one another. The present description provides a method of preparing construction cement materials using cellulose micro/nano materials of CF that contributes to the water redistribution during concrete mixture hydration process, thus providing a new adhesion chemistry amongst the cement particles and round fine desert sand.

In an embodiment, the present description provides a method of making mortar/concrete by adding a small amount of CF per weight of hydraulic binder (≤5% CF by weight of binder), providing adhesion between the cement particles, fine desert grains and coarse aggregates to make mortar/concrete. Filamentous cellulose is one of the most abundant materials on the planet extracted from plants and is an environmental friendly material. Thus it provides an economical and environment friendly approach to use enormous volume of sand available in deserts for the production of concrete and mortar.

A further advantage of this method is the simplicity of adding CF into the mixing of the concrete compositions with desert sand, cement, aggregates and other additives, such as air entraining agents, water reducing agents, superplasticizers, fly ashes, etc.

In accordance with another aspect, the CF is fully dispersed in water prior to mixing with the concrete/mortar mix. In accordance with yet another aspect, the cellulose filaments can be added individually into the concrete/mortar mixes to make the desert sand concrete, or mixtures thereof.

In accordance with yet another aspect, the preferable dosage of the cellulose micro/nano materials is in the dosage of 5% by weight of binder. In accordance with yet another aspect, the most preferable dosage of the cellulose micro/nano materials is in the dosage of 1.5% CF/binder by weight.

Cellulose nano filaments can be used to make concrete with desert sand, or also encompassed are mixture of multiple types of cellulose micro/nano materials.

In accordance with another embodiment described herein, a preferred dosage of the cellulose nano filament in the desert sand mixtures is in the range of ≤5%, preferably ≤3%, more preferably ≤1%, most preferably ≤0.5% CF/binder by weight.

In accordance with another embodiment described herein, a preferred dosage of the cellulose nano filament with low quality sand (such as desert sand, or sand with finer grain and narrower size distribution) mixtures is in the range of ≤5%, preferably ≤3%, more preferably ≤1%, most preferably ≤0.5% of CF/binder by weight. In a preferable embodiment described herein, adding CF into the composition of low quality sand, cement and gravel and other additive can effectively solve one of the key problems of using desert sand to make concrete. Addition of CF forms 3D network that provide appropriate adhesion amongst cement paste, low quality sand and cellulose filament to hold the round, smooth and fine sand particles together. In a preferable embodiment described herein, adding cellulose filaments into a mix of desert sand, cement and gravel and other additives can bridge the interfacial transition zone (ITZ) amongst cement and low quality sand.

Figure 11:
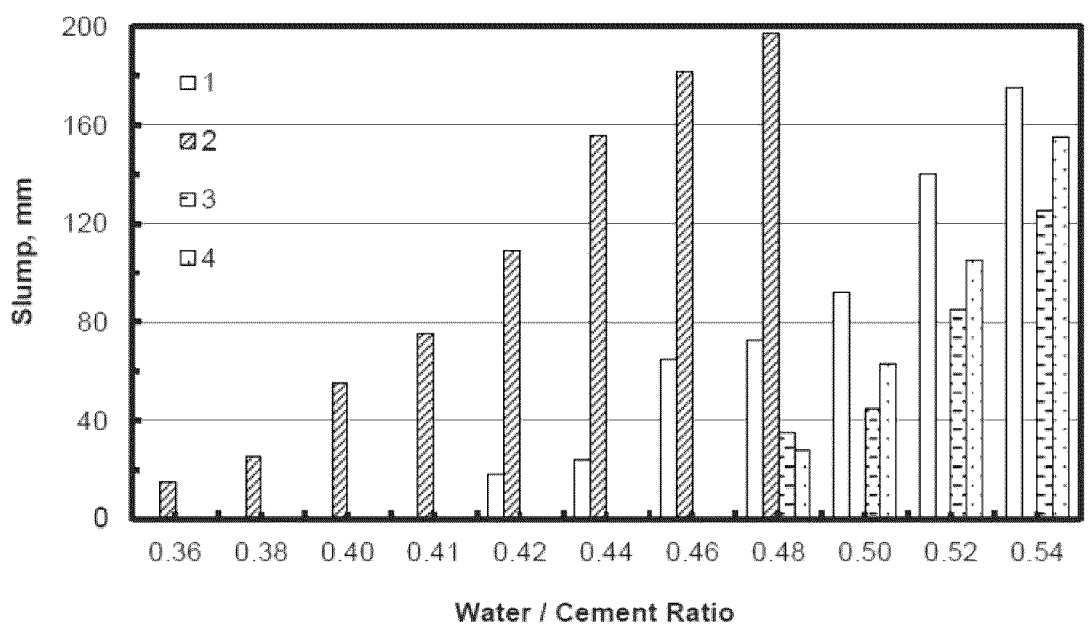
FIG. 11 is a histogram of slump vs water/cement ratio of fresh concrete mix with different types of sand, wherein (1): Lafarge sand, (2): Ottawa sand, (3): Yellow desert sand and (4): Dune sand. Wherein the slump of Ottawa sand (2) is 75 mm with water/cement ratio of 0.41; and at w/c of 0.42, the slump of Ottawa sand reached 109 mm where the slump of Lafarge sand (1) is just 18 mm; at W/C of 0.48, the slump of Ottawa sand is 197, while the slump of Lafarge sand (1) is 73 mm.

In accordance with another embodiment described herein, the low quality sand with round shape, smooth surface and narrow size distribution showed poor workability with different slump value at same water/cement ratio. The slump of Ottawa sand is extremely high and reaches 75 mm with water/cement ratio at 0.41; at W/C of 0.48, the slump of Ottawa sand is of 197 mm, while the slump of Lafarge sand is only 73 mm (FIG. 11). The high slump value of Ottawa sand is due to the round shape and smooth surface, even though its fineness modulus (2.11) is lower than Lafarge sand (2.93). The slump of Dune sand and Yellow desert sand (FIG. 11) are much lower than Ottawa sand, although they have round shape and smooth surface, and this is due to their smaller size and narrow size distribution. The fineness modulus of Yellow desert sand and Dune sand are only 0.88 and 0.99, respectively (Table 1), and which is much lower than Ottawa sand and Lafarge sand, which have larger surface area needed to be covered with the cement paste.

Figure 12:
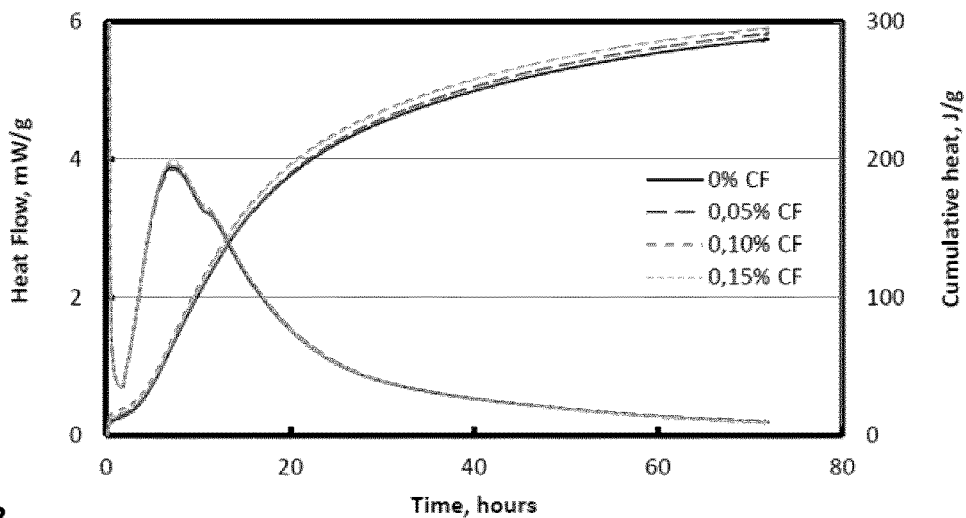
FIG. 12 shows hydration heat flow and cumulative hydration in mortar mixtures with (A) Lafarge sand, W/C=0.485; S/C=2; in (B) Ottawa sand, W/C=0.41, S/C=2; and in (C) Yellow desert sand, W/C=0.485; S/C=2
Figure 12:
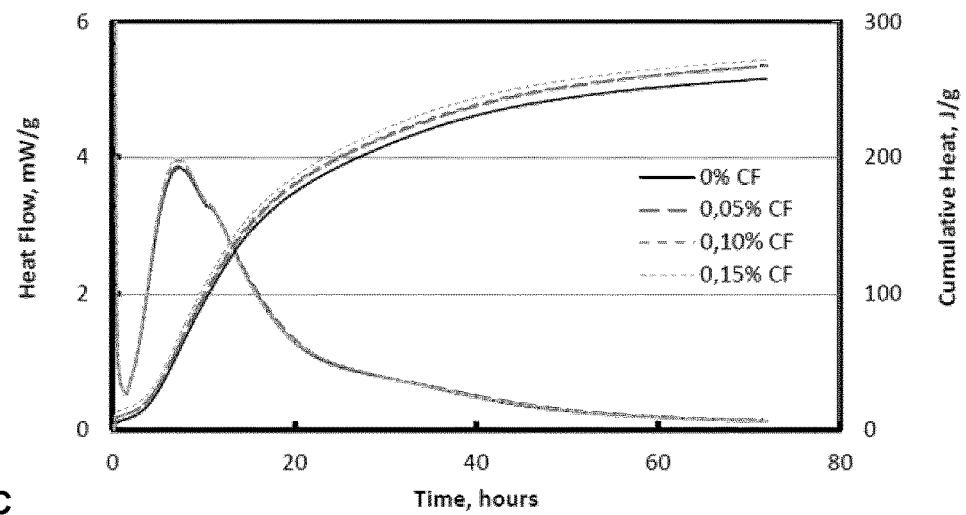
Figure 12:
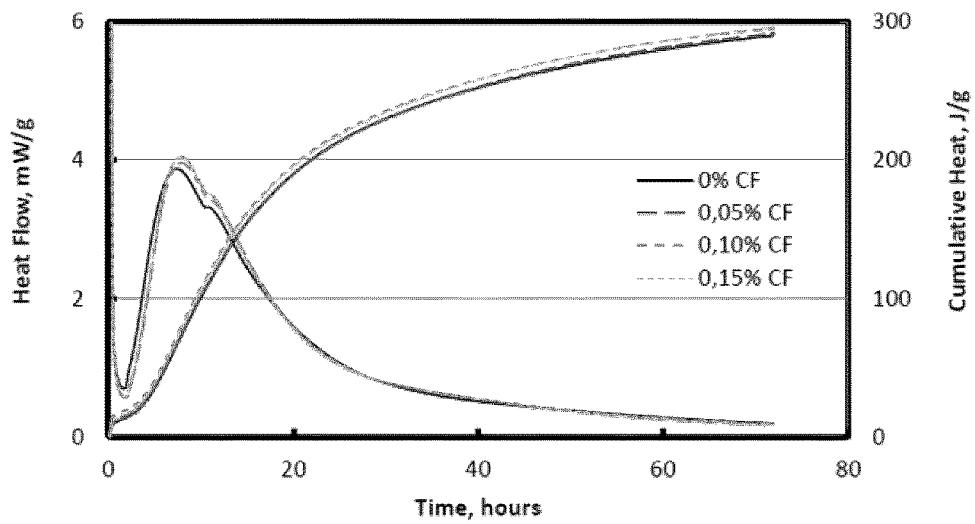

In a preferable embodiment described herein, adding cellulose filaments into the composition plays an important role during the cement hydration process. Accordingly, heat evolutions in the different mortar mixtures with different types of sand are depicted in FIG. 12 (FIG. 12A—Lafarge sand, 12B—Ottawa sand, and 12C—desert sand). The silicate hydration peaks are slightly higher and broader in the mixtures with CF for all types of sand (FIG. 12). This observation is further confirmed by the cumulative heat release where the cumulative released heat was slightly higher in all CF mixtures with all types of sand compared to that of the reference mixtures without incorporating CF. The mixture with 0.15% CF with Ottawa sand mortar, for instance, exhibited 5.6% higher cumulative heat release than that of the reference mixture. The increased heat of hydration observed in CF mixtures can be linked to the alkaline hydrolysis of cellulose, which is an exothermic reaction that promotes cement hydration and leads to a sort of acceleration which is further confirmed by the reduced setting time recorded in CF-self consolidated concrete mixtures (Hisseine et al. (2018, Journal of Materials in Civil Engineering, 30(6)).

The present concrete and mortar mixes are illustrated by, but not limited to, the following general procedures.

General Procedure A: Dispersion of CF, Cellulose Nanofibrils (CNF) and Microfibrillated Cellulose (MFC).

For the easiest dispersion of CF, cellulose nanofibrils (CNF) and microfibrillated cellulose (MFC) are dispersed into the concrete mixes; the CF, cellulose nanofibrils (CNF) and microfibrillated cellulose (MFC) may be fully dispersed in water prior to the mix.

For example, never-dried CF, CF film or CF-containing pulp, cellulose nanofibrils (CNF) and microfibrillated cellulose (MFC) can be dispersed with a standard laboratory method using a British disintegrator, or by Helico pulper, or other available pulper to an appropriate solid content (of consistency). The solid content can be measured after the dispersion.

General Procedure B: Preparation of a Mixture of Desert Sand, Cement, and/or Gravel A spherical sand, hydraulic binder, and/or silicate sand gravel, with an angular form deriving from rivers/beaches or crushed from stone, and/or coarse gravel aggregates are well mixed in a mixer according to concrete industry standard.

The dispersed CF, cellulose nano filaments, cellulose nanofibrils (CNF) and microfibrillated cellulose (MFC) solution from Procedure A is added into the mixer containing the dry ingredient which are mixed for an appropriate time according to the standard practice in the concrete industry. Admixture compounds such as air entraining agents, water reducing agents and other additives can also be added at this stage and may help to ensure a homogeneous composition of the desert sand concrete mixture.

General Procedure C: Rheology and Workability Test

The rheology, workability and air content can be measured by different approaches. The rheology, an important factor of the workability of the concrete compositions is normally measured onsite right after the mixing which is completed before casting the test samples. Two approaches can be used to measure the workability of the concrete composition, where the most common one is the "slump test", where a cone is used to cast the fresh composition, with the slump height measured to make sure that the rheology reaches a standard requirement. Another approach of rheology testing of concrete composition is the flow table test, which is a smaller scale test used to test the impact of different additives on the fluidity and is a good indicator of the rheology of the concrete composition.

Herein, the fluidity was measured using flow table for cement and sand mortar both by ASTM C1437-07 standard method and in-house set-up. The workability of the fresh concrete mix on slump and air content was measured according to ASTM C 143/C 143M-03 standard method.

General Procedure D: Samples Casting

After the rheology and air content reaches to a standard specification requirement, the concrete composition can be casted in a mold of different shapes: rectangle prism, cylinders, or any other types of molds depending on the mechanical and physical properties needed.

General Procedure E: Hardening and Curing

The cast concrete compositions are transferred to a conditioning chamber having a 100% relative humidity (RH) at 20±3° C. to harden the cast composition and eventually to cure it. Hardening and curing generally take 28 days for concrete to gain its full strength. The strength of concrete may continue to increase after 28 days with RH of 100% at 20±3° C. temperature, with a peak value normally attained after 3 months. It is important to harden and cure the casted concrete composition under controlled conditions as moisture and temperature have a huge impact on the hydration of cement.

General Procedure F: Performance Test

Mechanical properties, such as compression strength, flexural strength, split tensile strength, elastic modulus and Poisson's ratio are measured to ensure that the concrete reaches a specified requirement for different applications.

Other properties, such as spacing factor, salt scaling, freezing/thawing tests might be measured according to the requirement measuring the durability properties and depending on the application circumstance of the concrete to be produced.

The present disclosure will be more readily understood by referring to the following examples.

Example I

Study the Impact of Rheology/Workability of Mortar Made from Cellulose Filament (CF) on Desert Sand, Cement Composition at W/C=1

Hydraulic Binder is Portland cement Type 10, by Lafarge. Desert sand consists of nature desert sand imported from South Africa by Exo-Terra, distributed by Canada Rolf C. Hagen Inc. Montreal, and purchased from Amazon. River sand is from Bomix, all-purpose dried sand, which was purchased from Home Depot. Cellulose filament was produced from FPInnovations' pilot plant, which was fully dispersed in water prior to the mixing. The water/cement (W/C) ratio is 1 and S/C ratio is 2. The amounts of sand, cement, CF dosage, and water are found in Table 2.

The desired quantity of dry components such as sand and cement were measured and well mixed in the preparation stage. Dispersed CF was mixed with water then it was poured into the dry sand and cement mixture. It was well mixed manually and then it was placed into a metal cylinder on a flat plastic table as shown in FIG. 3. The spread diameter was measured and the shapes of the composition after removing the metal cylinder were photographed (FIG. 4).

A river sand, cement and water composition was prepared as a control sample, the same W/C ratio was used to compare the effect of adding CF to the desert sand composition. It was evident that adding CF, even as little as 0.14% CF/hydraulic binder into the composition had a significant impact on the rheology of the mortar mix with desert sand compositions.

To further confirm the previous observations, same W/C, sand/cement ratio and CF dosage experiments were repeated. The fluidity is repeatable and the results are the same as shown in Table 2 and in FIG. 4.

The microstructure of cement desert sand mortar was characterized by light microscope as seen in FIG. 6A, and the cracking can be clearly observed by naked eyes, while the mortar made from desert sand with the presence of CF looks similar with the mortar sample made from river sand as indicated in FIGS. 6B and C. More clearly, the microstructure of desert sand, cement particles and CF was characterized with SEM micrograph. The microstructure of desert sand mortar with the presence of CF also showed clear network of CF, bridging the cement particles and desert sand, and forming a 3D network to prevent the spherical desert sand to slide against each other.

TABLE 2

Spread diameter of the compositions flow table test

| Composition | Sand Type | CF dosage (%) | Cement (g) | Water (g) | Sand (g) | CF (g) | Fluidity Diameter (cm) |
|---|---|---|---|---|---|---|---|
| 1 | River sand | 0 | 65.79 | 65.79 | 118.42 | 0 | 15.1 |
| 2 | Desert sand | 0 | 65.79 | 65.79 | 118.42 | 0 | 21.3 |
| 3 | Desert sand | 1.41 | 65.55 | 65.55 | 117.99 | 0.92 | 5.0 |
| 4 | Desert sand | 0.28 | 65.74 | 65.74 | 118.33 | 0.18 | 10.0 |
| 5 | Desert sand | 0.14 | 65.77 | 65.77 | 118.38 | 0.09 | 15.5 |

Example II

Study of the Impact of CF Binding Desert Sand (Impact of Adhesion Chemistry of Cellulose Filamentous on Spherical Sand Grains)

The raw materials include Ottawa sand (Dunes in Ottawa, Ill., USA ordered from Global Gilson), River sand (River sand from Bomix, all-purpose dried sand, purchased from Home Depot), and three types of desert sand (Yellow, Red, and Black) were imported from different locations of the world by Exo-Terra, distributed by Canada Rolf C. Hagen Inc. Montreal, and purchased from Amazon. Cellulose filament, which was produced from FPInnovations' pilot plant, it was fully dispersed in water prior to the mixing. Two CF/sand ratio (0.5%, 1%) were used to mix the sand and it was casted in a rectangular mold. Surprisingly, after the drying out of the water, the casted sand/CF mixtures remain the same shape as it was casted, which indicated that CF alone can bind the sand together.

The dried mixture of sand/CF formed an entity after drying as seen in FIG. 9A. The samples of dried mixture of sand with higher CF ratio are stronger (FIG. 9B). By mixing dispersed CF with the spherical sand grain, it provided a method to prevent the sliding of individual sand grains against one another and therefor contributing to the stabilization of the building materials. The microstructure of the sand/CF mixture was characterized by SEM. The binding between CF and desert sand particles showed a clear adhesion to anchor the smooth and round surface of the desert sand as it can be clearly observed in FIG. 9C, where the CF network forms a strong binding to prevent the sliding of individual sand grains against one another.

Example III

Study the Impact of Rheology/Workability of Cellulose Micro/Nano Materials on Desert Sand, Cement Composition at W/C=0.63

The raw materials are as described previously and cellulose filament was fully dispersed in water prior to the mixing. The water/cement (W/C) ratio was 0.63, S/C ratio is 2. The sand, cement, CF dosage, and water are listed in Table 3 and the shapes of the small cylinder slump test are shown in FIG. 7.

TABLE 3

Formulation for composition of W/C = 0.63 with desert sand and CF

| Composition | Sand Type | CF dosage (%) | Cement (g) | Water (g) | Sand (g) | CF (g) |
|---|---|---|---|---|---|---|
| 1 | Desert sand | 0 | 72.89 | 45.92 | 131.20 | 0 |
| 2 | Desert sand | 0.70 | 72.74 | 45.82 | 130.93 | 0.51 |
| 3 | Desert sand | 0.275 | 72.83 | 45.88 | 131.09 | 0.20 |
| 4 | Desert sand | 0.14 | 72.86 | 45.90 | 131.14 | 0.10 |

The sand and cement were measured and mixed well before adding water. Dispersed CF was mixed with water and then added into the dry sand and cement mixture. All the ingredients were well mixed manually and then placed into the metal cylinder on a flat transparent plastic table.

Adding CF, even as little as 0.14% CF by weight of binder into the composition had a significant impact on the rheology of the desert sand compositions.

Example IV

Study the Impact of Rheology/Workability of Different Cellulose Nanofibrils (CNF) and Microfibrillated Cellulose (MFC) and Cellulose Filament (CF) on Desert Sand, Cement Composition at W/C=1

The materials used are: hydraulic binder (Portland cement Type 10, by Lafarge); Yellow desert sand; MFC 1 in a form of around 3.15% solid content paste, the particle size distribution is in the range of microns; MFC 2 in a form of paste with solid content from 3.9%, the length of the particle size up to 500 microns; CNF in a form of paste with solid content around 3%, with a width around 50 nm and length up to several hundred microns; and never-dried CF in a form of around 30% solid content, the width of the CF in the range from about 30 nm to about 500 nm, while average length from about 200 μm to about 2 mm. All the cellulose nano materials were fully dispersed in water prior to mixing. The water/cement (W/C) ratio is 1 and S/C ratio is 2. The amounts of sand, cement, cellulose filament dosage, and water are found in Table 4.

Figure 8:
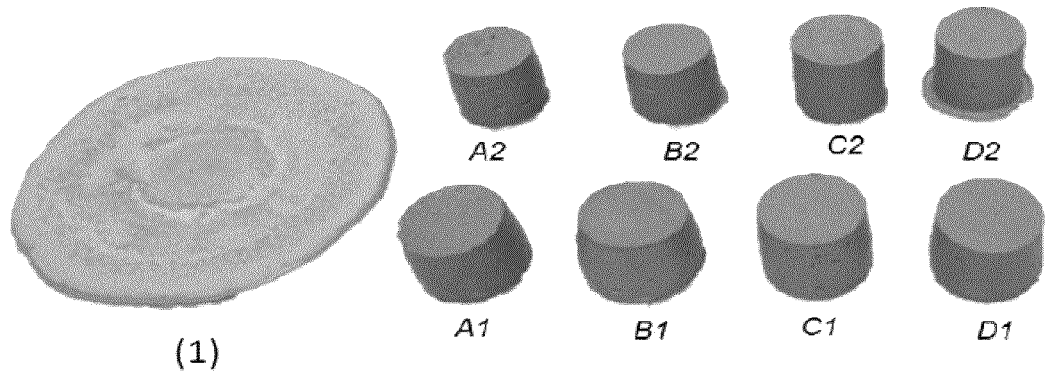
FIG. 8 are photographs of cement and Yellow desert sand mortar with different types of cellulose nano/micro filaments, W/C=1, wherein (1) is the control sample made with cement and desert sand without CF; cement and Yellow desert sand mortar mixes with (A1): 1.5% CF; (A2): 3% CF; (B1): 1.5% MFC1; (B2): 3% MFC1; (C1): 1.5% CNF; (C2): 3% CNF; (D1): 1.5% MFC2; and (D2): 3% MFC2.

The desired quantity of dry components such as sand and cement were measured and well mixed in the preparation stage. Dispersed CF was mixed with water and poured into the dry sand and cement mixture. It was well mixed manually and then it was placed into the metal cylinder on a flat plastic table as shown in FIG. 3. The spread diameter was measured and the shapes of the composition after removing the metal cylinder were photographed (FIG. 8).

TABLE 4

Formulation for composition of W/C = 1 with desert sand and different cellulose nano/micro filaments

| Type of cellulose nano/micro filaments | Products form | Dosage of cellulose nano/micro filaments (%) | Cement (g) | Water (g) | Desert Sand (g) | Cellulose nano/micro filament (g) |
|---|---|---|---|---|---|---|
| CF | 30% never-dried CF | 3 | 65.27 | 65.27 | 117.49 | 1.96 |
| CNF | 3% paste | 3 | 65.27 | 65.27 | 117.49 | 1.96 |
| MFC 1 | 3.15% paste | 3 | 65.27 | 65.27 | 117.49 | 1.96 |
| MFC 2 | 3.9% paste | 3 | 65.27 | 65.27 | 117.49 | 1.96 |
| CF | 30% never-dried CF | 1.5 | 65.53 | 65.53 | 117.96 | 0.98 |
| CNF | 3% paste | 1.5 | 65.53 | 65.53 | 117.96 | 0.98 |
| MFC 1 | 3.15% paste | 1.5 | 65.53 | 65.53 | 117.96 | 0.98 |
| MFC 2 | 3.9% paste | 1.5 | 65.53 | 65.53 | 117.96 | 0.98 |

Example V

Study the Impact of CF on Mortar Made from Lafarge Sand According to ASTM C109

Materials used are Lafarge sand (9071 SG, concrete construction grade sand, from St-Gabriel-de-Brandon, QC, Canada, supplied by Lafarge); Portland cement with Limestone Type GUL (St-Constant, QC, Canada, supplied by Lafarge); and CF, produced from FPInnovations' pilot plant.

The mortar preparation using Lafarge sand, GUL cement and CF at different ratio from (0-0.20%) was prepared according to ASTM C109 and the formulations are listed in Table 5. Known amount of sand and cement was mixed in a Hobart mixer, a known amount of CF dispersed into water was added into the mix and it was mixed for 2 minutes.

TABLE 5

Formulation with Lafarge sand and CF

| Components | Mass (g) | Density (kg/m³) | Volume (×10⁻³m³) |
|---|---|---|---|
| CF (0-0.2%) | 0 | 1500 | 0 |
|  | 1.6 | 1500 | 0.001 |
| Water | 388 | 998 | 0.389 |
| Cement | 800 | 3130 | 0.256 |
| Sand | 2200 | 2686 | 0.819 |
| Total |  |  | 1.465 |

The fluidity of hydraulic cement mortar was measured according to ASTM C1437-07. The results of the fluidity are shown in Table 6. The fluidity decreased with the increasing of CF ratio.

After the flow table test, sample of 2"×2"×2" cubes were casted in metal molds and the molds were put in a humidity chamber with controlled relative humidity above 95% at 23° C. for 24±1 hrs for hardening. The hardened cubes were then removed from the mold and put into a curing bath with controlled pH value in a curing chamber for 28 days. The compressive strength (Table 6) of the mortar cubes were measured according to ASTM C 109 (Standard Test Method for Compressive Strength of Hydraulic Cement Mortars). Compared to the control sample, only one group of samples' compressive strength is 4.8% higher after 7 days of curing at the dosage of 0.05% CF. Surprisingly, after 28 days, the compressive strength of three groups with 0.025%, 0.05% and 0.10% of CF were higher than the control samples, where the highest increase is of an 11% improvement with 0.05% CF added into the formulation.

TABLE 6

Compressive strength after 7 days and 28 days (ASTM C 109), and flow table test (ASTM C1437-07) results of mortar prepared with Lafarge sand and CF

| CF % (by mass verse cement binder) | Density of mortar (g/cm³) | Compressive Stress (MPA) | | Flow table test (ASTM C1437-07) |
|---|---|---|---|---|
| | | 7 days | 28 days | Average Flow (%) |
| 0 | 2.3 | 46.3 ± 1.4 | 53.7 ± 3.2 | 95 |
| 0.025 | 2.3 | 43.8 ± 2.3 | 54.2 ± 1.2 | 107 |
| 0.05 | 2.3 | 48.5 ± 1.1 | 59.6 ± 3.0 | 98 |
| 0.10 | 2.3 | 43.1 ± 0.9 | 53.9 ± 2.7 | 86 |
| 0.15 | 2.3 | 44.0 ± 1.5 | 46.4 ± 4.0 | 68 |
| 0.20 | 2.3 | 41.0 ± 0.5 | 51.8 ± 2.1 | 67 |

Example VI

Mortar Made from Ottawa Sand with Addition of CF According to ASTM C109

Materials used are Ottawa sand (Dunes in Ottawa, Ill., USA ordered from Global Gilson); Portland cement with Limestone Type GUL (St-Constant, QC, Canada, supplied by Lafarge); and CF, produced from FPInnovations' pilot plant.

The mortar preparation using Ottawa sand, GUL cement and CF at different ratio from (0-0.20%) was prepared according to ASTM C C109 and the formulations are listed in Table 7. Known amount of sand and cement was mixed in a Hobart mixer, a known amount of CF dispersed into water was added and mixed.

TABLE 7

Formulation of Ottawa sand mortar with different ratio of CF

| | Mass (g) | Density (kg/m³) | Volume (×10⁻³m³) |
|---|---|---|---|
| CF (0-0.2%) | 0 | 1500 | 0 |
|  | 1.6 | 1500 | 0.001 |
| Water | 328 | 998 | 0.329 |
| Cement | 800 | 3130 | 0.256 |
| Sand | 2200 | 2686 | 0.819 |
| Total |  |  | 1.405 |

The fluidity of hydraulic cement mortar with Ottawa sand was measured according to ASTM C1437-07. After the flow table test, sample of 2"×2"×2" cubes were casted in metal molds and the molds were put in a humidity chamber with controlled relative humidity above 95% at 23° C. for 24±1 hours for hardening. The hardened cubes were then removed from the molds and put into a curing bath with controlled pH value in a curing chamber for 28 days. The compressive strength (Table 8) of the Ottawa sand mortar cubes were measured according to ASTM C 109 (Standard Test Method for Compressive Strength of Hydraulic Cement Mortars). Compared to the control sample, surprisingly, one group of samples' compressive strength is 9.2% higher after 7 days of curing at the dosage of 0.10% CF. Surprisingly, after 28 days, the compressive strength of two groups with 0.05% and 0.10% are higher than the control samples, where the highest increase is of 9.8% improvement with 0.10% CF addition in the formulation.

TABLE 8

Compressive strength after 7 days and 28 days (ASTM C 109), of mortar prepared with Ottawa sand and CF

| | | Compression Strength (MPa) | | |
|---|---|---|---|---|
| CF % by Mass | Density (g/cm³) | 7 days | Density (g/cm³) | 28 days |
| 0 | 2.25 | 37.8 ± 3.9 | 2.25 | 43.5 ± 2.9 |
| 0.05 | 2.26 | 37.0 ± 3.7 | 2.25 | 47.8 ± 4.4 |
| 0.10 | 2.25 | 41.3 ± 4.4 | 2.26 | 45.4 ± 2.8 |
| 0.15 | 2.25 | 35.1 ± 3.0 | 2.27 | 39.2 ± 5.9 |

Example VII

Concrete Mix with Construction Grade Sand and CF

Materials used are Lafarge sand (9071 SG, concrete construction grade sand, from St-Gabriel-de-Brandon, QC, Canada, supplied by Lafarge); Portland cement with Limestone Type GUL (St-Constant, QC, Canada, supplied by Lafarge); and CF (produced from FPInnovations' pilot plant). A polycarboxylate-based high range water reducing admixture with 32% solid content was added at the dosage of 2500 ml/m³ to secure the target workability of 80 mm±30 mm.

The formulation of Portlant cement GUL type, Lafarge sand, gravel aggregate and the amount of materials were mixed for the compositions as listed in Table 9. The results of slump and air content of the fresh concrete mix with Lafarge sand was shown in Table 9, as well as the air content of fresh mix and the density of the cured concrete.

TABLE 9

Formulation compositions of concrete made from Lafarge sand with different CF ratio

| Compositions | 1 | 2 | 3 |
|---|---|---|---|
| CF Content, % | 0 | 0.05 | 0.15 |
| CF, kg/m$^3$ | 0 | 0.19 | 0.58 |
| Initial water to cement (W/C) ratio | | 0.44 | |
| Cement GUL, kg/m$^3$ | | 385 | |
| Aggregate 5-14 mm, kg/m$^3$ | | 1011.6 | |
| Lafarge sand, kg/m$^3$ | | 774.8 | |
| AEA, mL/m$^3$ | | 125 | |
| WRA/SUP, mL/m$^3$ | | 2500 | |
| Slump, mm | 66 | 62 | 62 |
| Air Content, % | 3.3 | 3 | 2.4 |
| Density, kg/m$^3$ | 2430 | 2437 | 2447 |

Figure 13:
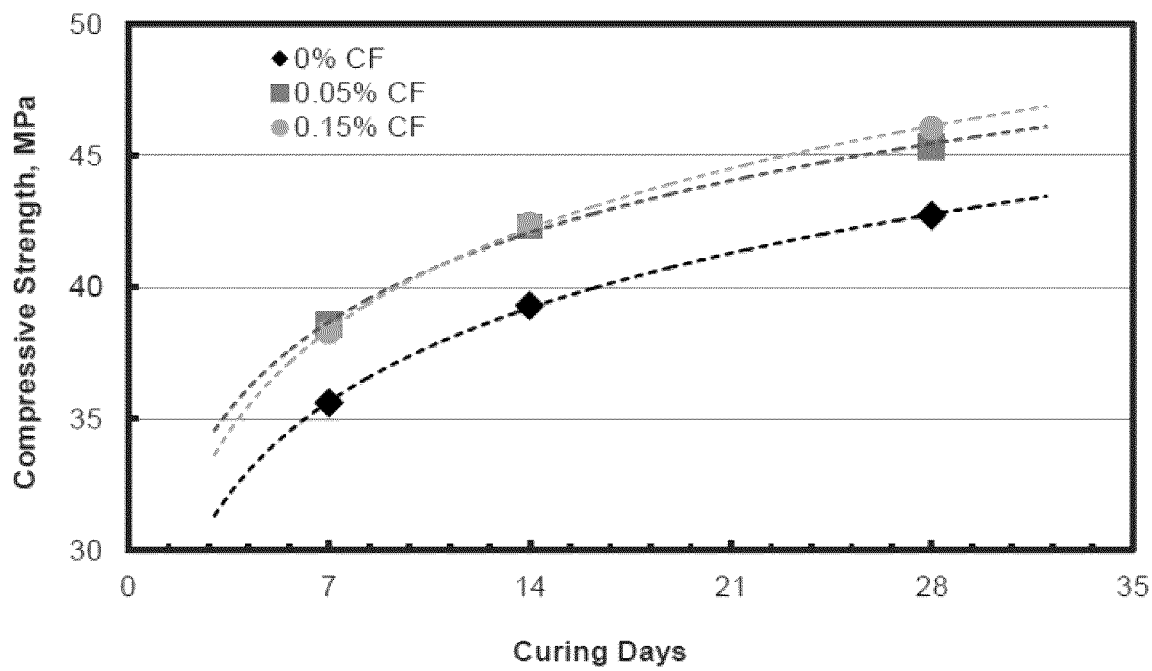
FIG. 13 shows the compressive strength vs. curing time of concrete mix with different CF ratio, using Lafarge sand.
Figure 17:
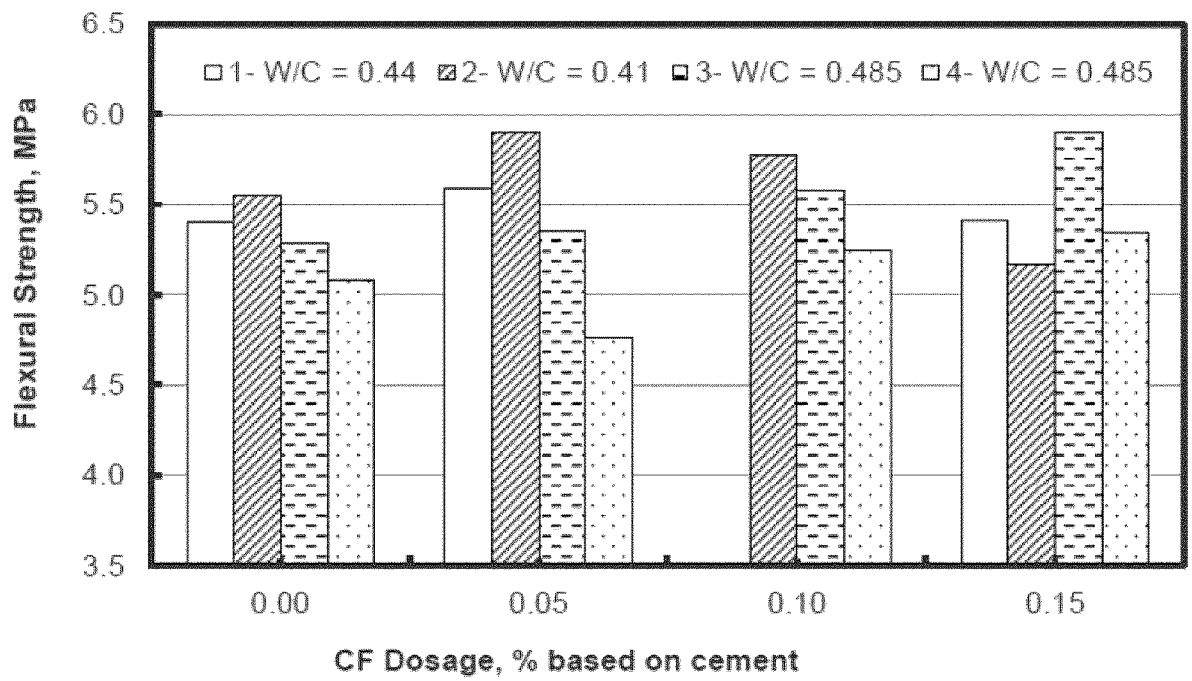
FIG. 17 shows the flexural strength of concrete mix, at 28 days of curing, wherein sample (1) is Lafarge sand, (2) Ottawa sand, (3) Yellow desert sand, and (4) Dune sand.
Figure 18:
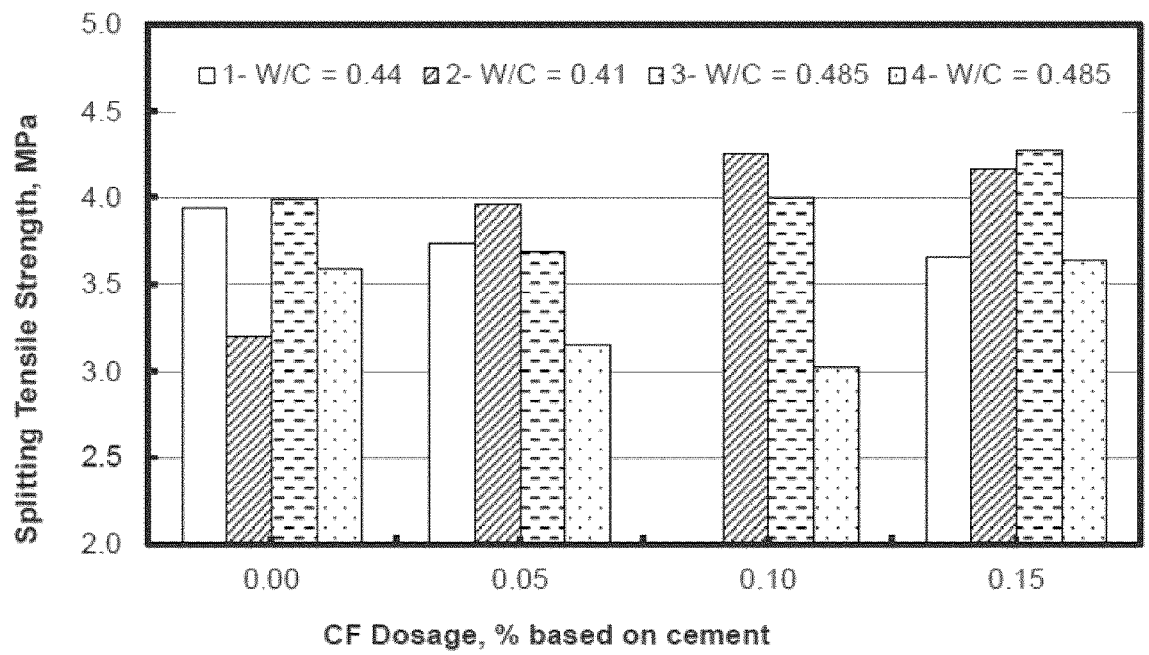
FIG. 18 shows the splitting strength of concrete mix, at 28 days of curing, wherein sample (1) is Lafarge sand, (2) Ottawa sand, (3) Yellow desert sand, and (4) Dune sand.

The compressive strength results of concrete made from Lafarge sand with different ratio of CF are reported in FIG. 13. The compressive strength improved with the curing time for all the formulation. There is around 7.5-8% improvement when comparing the control samples with addition of 0.05% CF and 0.15% CF. The increasing trend remained similar with the curing time from 7 days, 14 days to 28 days. The flexural strength is slightly increased with the addition of 0.05% CF, and no increase with 0.1% CF addition (FIG. 17). The splitting tensile strength of concrete made from Lafarge sand is slightly decreased by the addition of CF (FIG. 18).

Example VIII

Concrete Made with Ottawa Sand by Addition of CF

Materials used are Ottawa sand; Portland cement with Limestone Type GUL (St-Constant, QC, Canada, supplied by Lafarge); and CF, produced from FPInnovations' pilot plant. A polycarboxylate-based high range water reducing admixture with 32% solid content was added at the dosage of 2500 ml/m$^3$ to secure the target workability of 80 mm±30 mm.

Portlant cement GUL type, Ottawa sand, gravel aggregate and the amount of materials were mixed for the compositions as listed in Table 10. The slump and air content of the fresh concrete mix with Ottawa sand is shown in Table 10, as well as the air content of fresh mix and the density of the cured concrete.

TABLE 10

Formulation compositions of concrete made from Ottawa sand with different CF ratio

| Composition | F1 | F2 | F3 | F4 |
|---|---|---|---|---|
| CF Content, % | 0 | 0.05 | 0.10 | 0.15 |
| CF, kg/m$^3$ | 0 | 0.19 | 0.39 | 0.58 |
| Cement GUL, kg/m$^3$ | | 385 | | |
| Aggregate 5-14 mm, kg/m$^3$ | | 1011.6 | | |
| W/C | | 0.41 | | |
| Ottawa sand, kg/m$^3$ | | 774.8 | | |
| AEA, mL/m$^3$ | | 125 | | |
| WRA/SUP, mL/m$^3$ | | 2500 | | |
| Slump, mm | 75 | 70 | 71 | 84 |
| Air Content, % | 5.5 | 5.6 | 5.8 | 4.2 |
| Density, kg/m$^3$ | 2370 | 2384 | 2389 | 2416 |

Figure 14:
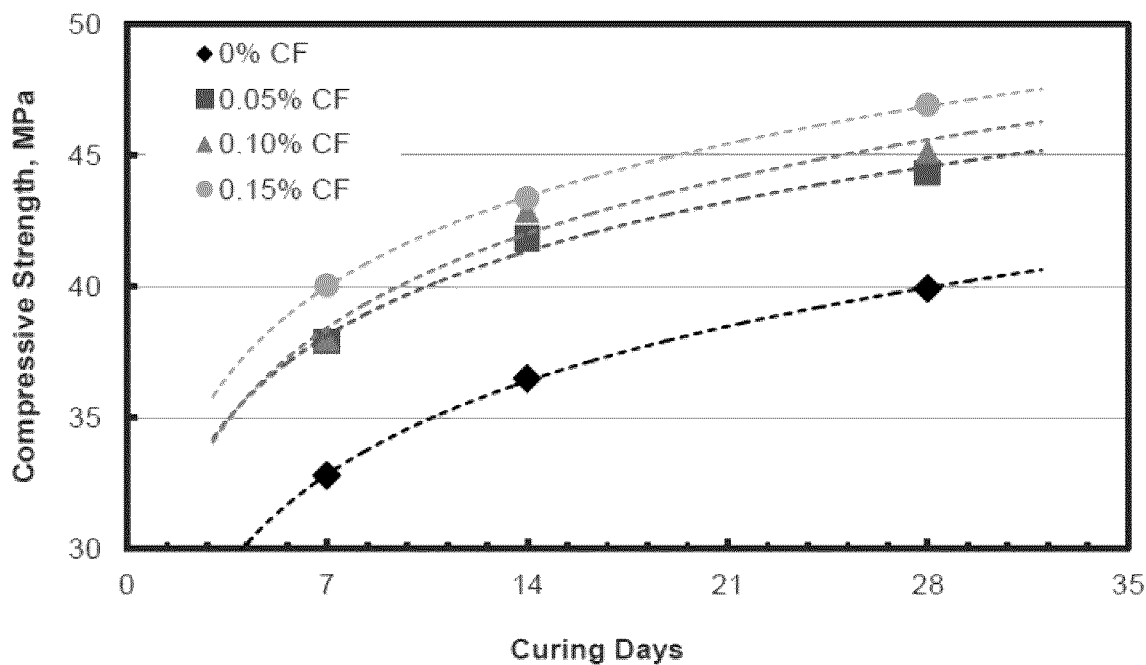
FIG. 14 shows the compressive strength vs. curing time of concrete mix with different CF ratio, using Ottawa sand.

The compressive strength results of concrete made from Ottawa sand with different ratio of CF are seen in FIG. 14. Surprisingly, the compressive strength increased 22% with addition of 0.15% compared to the control sample with Ottawa sand concrete without CF. There was 16% improvement on the compressive strength for 0.1% CF into the Ottawa sand formulation after 7 days of curing. All the formulations with addition of CF have obvious improvement in compressive strength after 7 days, 14 days and 28 days curing. The flexural strength of Ottawa sand concrete with addition of CF at 0.05% was increased 7.3% and a slight improvement at 0.1% CF (FIG. 17). The splitting tensile strength was improved 33% with addition of 0.1% CF, all splitting tensile strength improved with addition of CF after 28 days curing for Ottawa sand concrete (FIG. 18).

Example IX

Concrete Made with Yellow Desert Sand by Addition of CF

Materials used are Yellow desert sand; Portland cement with Limestone Type GUL (St-Constant, QC, Canada, supplied by Lafarge); and CF, produced from FPInnovations' pilot plant. A polycarboxylate-based high range water reducing admixture with 32% solid content was added at the dosage of 4000 ml/m$^3$ to secure the target workability of 80 mm±30 mm.

Portlant cement GUL type, Yellow desert sand, gravel aggregate and the amount of materials were mixed for the compositions listed in Table 11. The slump and air content of the fresh concrete mix with Yellow sand is listed in Table 11. The air content of fresh mix and density of the cured concrete is reported in Table 11.

TABLE 11

Formulation of concrete made from Yellow desert sand with CF

| Composition | F1 | F2 | F3 | F4 |
|---|---|---|---|---|
| CF Content, % | 0 | 0.05 | 0.10 | 0.15 |
| CF, kg/m$^3$ | 0 | 0.19 | 0.39 | 0.58 |
| Cement GUL, kg/m$^3$ | | 385 | | |
| Aggregate 5-14 mm, kg/m$^3$ | | 1011.6 | | |
| W/C | | 0.485 | | |
| Yellow desert sand, kg/m$^3$ | | 774.8 | | |
| AEA, mL/m$^3$ | | 125 | | |
| WRA/SUP, mL/m$^3$ | | 4000* | | |
| Slump, mm | 87 | 75 | 75 | 107 |
| Air Content, % | 4.2 | 3.5 | 2.4 | 2.5 |
| Density, kg/m$^3$ | 2390 | 2404 | 2420 | 2423 |

Figure 15:
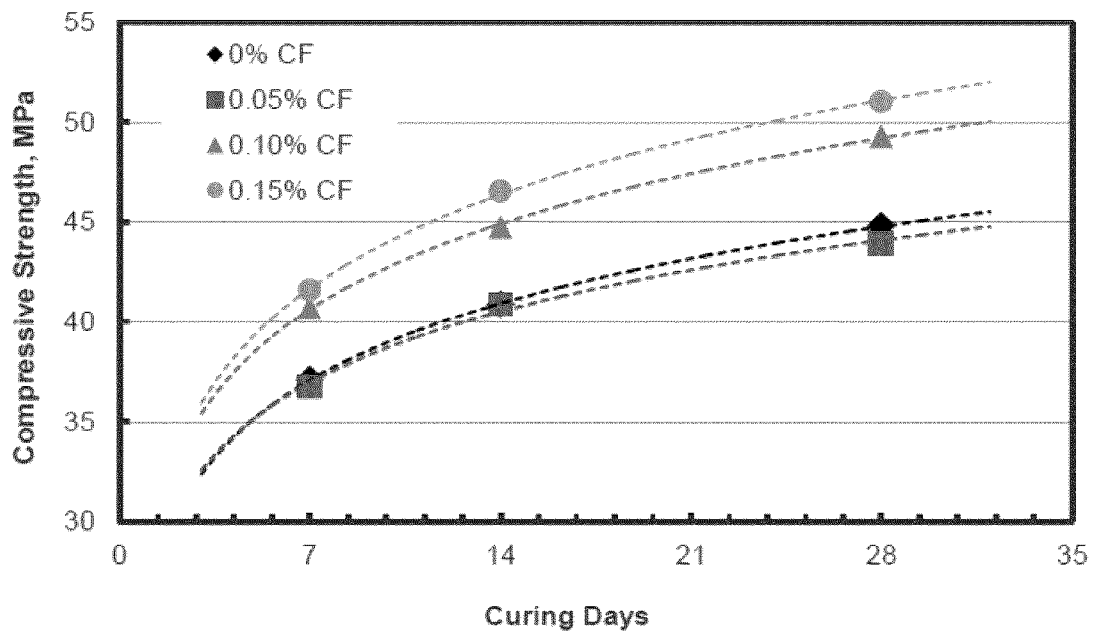
FIG. 15 shows the compressive strength vs. curing time of concrete mix with different CF ratio, using Desert sand.

The compressive strength results of concrete made from Yellow desert sand with different ratio of CF are reported in FIG. 15. The compressive strength increased 11% with addition of 0.1% CF compared to the control sample with yellow desert sand concrete after 7 days of curing. The improvement on compressive strength is 14% with 0.15% CF after 28 days curing. The trend is clear that adding CF up to 0.1-0.15% has positive impact on compressive strength improvement. Surprisingly, the flexural strength increased with the increase of CF ratio and up to 11% at 0.15% CF after 28 days of curing. The splitting tensile of Yellow sand concrete increased 7% with addition of 0.15% CF.

Example X

Concrete Made with Dune Sand by Addition of CF

Materials used are Dune sand from Oregon State, US; Portland cement with Limestone Type GUL (St-Constant, QC, Canada, supplied by Lafarge); and CF, produced from FPInnovations' pilot plant. A polycarboxylate-based high range water reducing admixture with 32% solid content was added at the dosage of 4000 ml/m³ to secure the target workability of 80 mm±30 mm.

Portlant cement GUL type, Dune desert sand, gravel aggregate and the amount of materials were mixed for the compositions as listed in Table 12. The slump and air content of the fresh concrete mix with Dune sand is shown in Table 12, as well as the air content of fresh mix and the density of the cured concrete is also reported in Table 12.

TABLE 12

Formulation of dune sand concrete with addition of CF

| Composition | F1 | F2 | F3 | F4 |
|---|---|---|---|---|
| CF Content, % | 0 | 0.05 | 0.10 | 0.15 |
| CF, kg/m³ | 0 | 0.19 | 0.385 | 0.58 |
| Cement GUL, kg/m³ | | | 385 | |
| Aggregate 5-14 mm, kg/m³ | | | 1011.6 | |
| W/C | | | 0.485 | |
| Yellow desert sand, kg/m³ | | | 774.8 | |
| AEA, mL/m³ | | | 125 | |
| WRA/SUP, mL/m³ | | | 4000 | |
| Slump, mm | 75 | 105 | 63 | 70 |
| Air Content, % | 4.8 | 4.4 | 4.4 | 4.3 |
| Density, kg/m³ | 2383 | 2393 | 2399 | 2420 |

Figure 16:
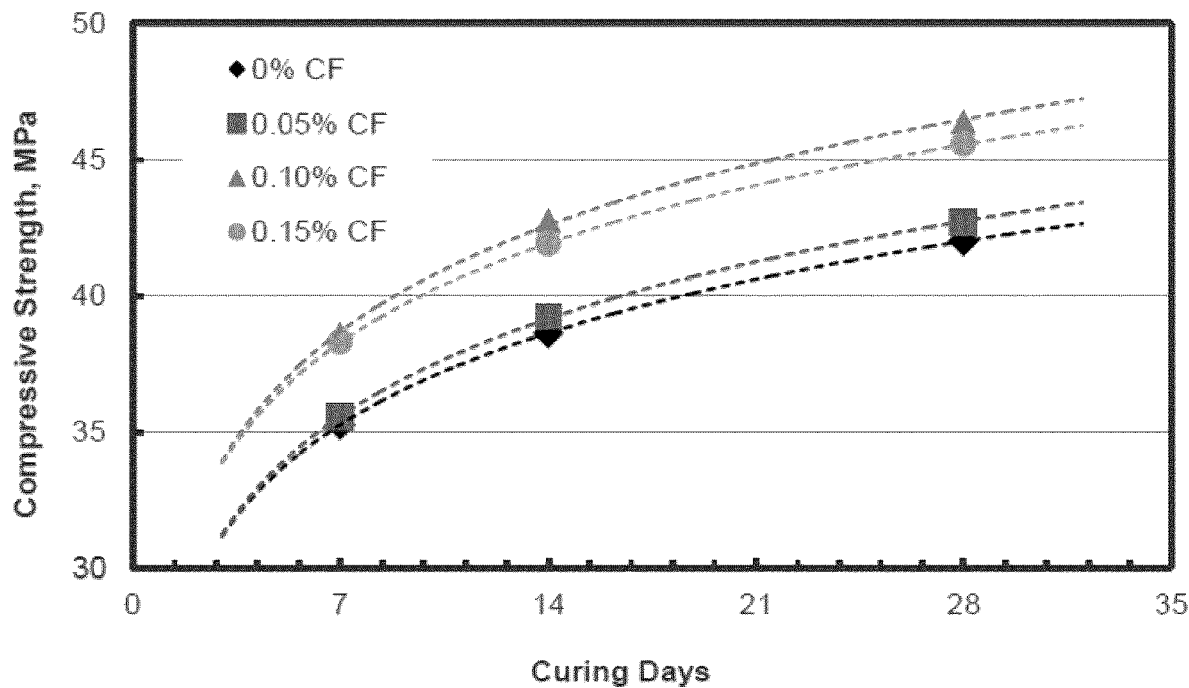
FIG. 16 shows the compressive strength vs. curing time of concrete mix with different CF ratio, using Dune sand.

The compressive strength results of concrete made from Dune sand with different ratios of CF are reported in FIG. 16. The compressive strength increased 9.4% with addition of 0.1% CF compared to the control sample with Dune sand concrete after 7 days of curing. The improvement on compressive strength is 10.5% with 0.15% CF after 28 days curing. The trend is clear that adding CF at 0.1-0.15% has positive impact on compressive strength improvement. Both flexural strength and splitting tensile strength are improved slightly with addition of CF at 0.1%-0.15%.

Example XI

Impact of CF on Concrete Composition Made with Regular Construction Sand, Cement and Gravel Portland cement, regular construction sand, gravel aggregate and the amount of materials were mixed for the compositions as listed in Table 13.

TABLE 13

Mixes and percentage of cellulose filaments (CF)

| Components | 1 Without CF | 2 0.10% CF 0.39 kg/m³ | 3 0.15% CF 0.58 kg/m³ |
|---|---|---|---|
| Water, kg/m³ of concrete composition | 170 | 170 | 170 |
| Cement GU, kg/m³ of concrete composition | 385 | 385 | 385 |
| Aggregate 5-20 mm, kg/m³ of concrete composition | 1025 | 1025 | 1025 |
| Sand, kg/m³ of concrete composition | 770 | 770 | 770 |
| Air-entraining admixture, MasterAir AE210, BASF, ml/m³ of concrete composition | 125 | 125 | 125 |
| Water-reducing admixture, MasterPozzolith, BASF, l/m³ of concrete composition | 1.0 | 1.0 | 1.0 |
| Water-reducing admixture, Rheobuild 1100, BASF, l/m³ of concrete composition | — | 1.0 | 1.25 |
| Initial water to cement (W/C) ratio | 0.44 | 0.44 | 0.44 |
| Density, kg/m³ of concrete composition | 2350 | 2350 | 2350 |

Note:
0.1% CF, 0.39 kg/m³ means the amount of CF per cubic meter of concrete;
0.15% CF, 0.58 kg/m³ is the amount of CF per cubic meter of concrete.

Figure 19:
FIG. 19 is a photograph showing the rupture surface of CF reinforced concrete with regular construction sand, wherein (A) is a photograph of concrete without addition of CF, illustrating a fracture surface shown by many white spots, which indicated that the breakage happened at the interfacial transition zone (ITZ) amongst cement pasted and aggregates; (B) is a photograph of concrete with 0.25% CF per cement illustrating the fracture surface has some black spots, which indicated that the breaking happened in between the aggregates; and (C) is a photograph of concrete with with 0.5% CF, the fracture surface has more black spots, which indicate more coarse aggregates was broken.
Figure 20:
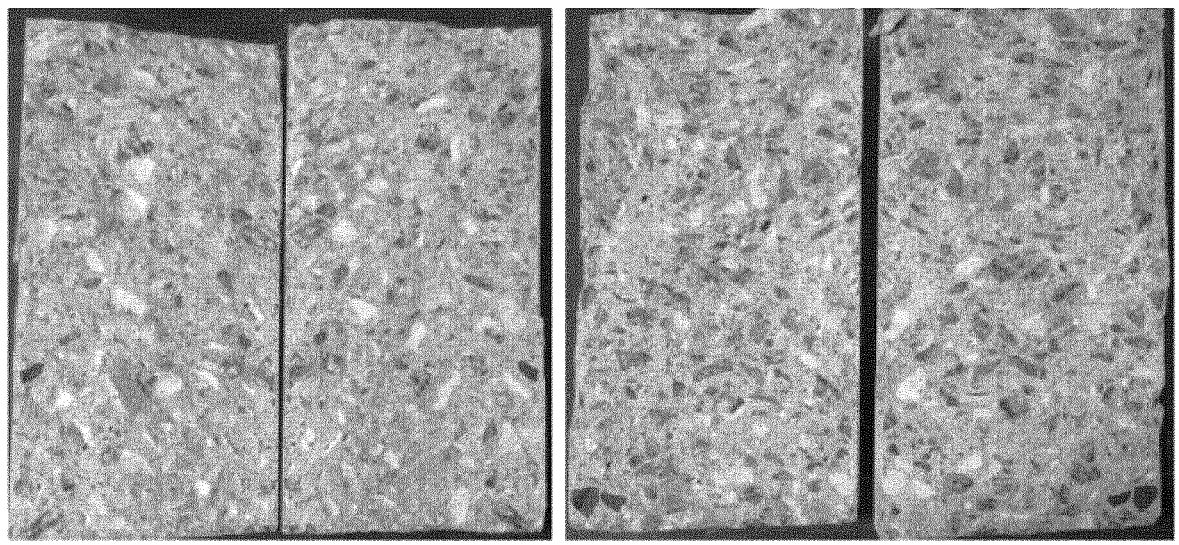
FIG. 20 is a photograph showing the split tensile fracture surface of concrete with regular construction sand and addition of CF wherein in (A) 0% CF, with poor adhesion, and in (B) concrete with river sand and 0.5% CF, with better adhesion amongst cement paste and coarse aggregates at ITZ.

The photograph of fracture surface of mixture of CF, cement, sand and gravel after the flexural test is seen in FIG. 19. FIG. 19A is the fracture photograph of the reference sample, a regular concrete mix without adding CF into the mix. It was observed that there are lot of white spots, which are the breakage edges at the interfacial transition zone amongst cement paste and gravel aggregate, which indicated that the ITZ of the regular concrete mix are weak areas in the concrete composites. When one looks at the fracture surface of concrete mix with addition of CF, surprisingly, it was observed that where the gravel aggregates were broken, black spots with darker color area appeared (FIGS. 19B and 19C), which indicated that adding CF improved the adhering at the ITZ amongst cement and gravel aggregates. More surprisingly, similar breakage at gravel aggregates were also observed for the tensile splitting samples (FIG. 20), where the fracture surfaces of concrete with CF showed a greater proportion of ruptured coarse aggregates than that in concrete without CF, which shows more detachment at the ITZ aggregates-paste contact. It was a surprising discovery that the adherence at the aggregates-paste contact is improved by the addition of CF.

The properties of CF mixed with cement, construction sand, gravel aggregates, air entraining agent, and superplasticizers are summarized in Table 14. It can be seen that adding a small amount of CF improved compression strength, up to 20% with the addition of only 0.14% CF by weight of binder. The compression strength obtained was 37.3 MPa, which is higher than 36.4 MPa for the concrete admixture without CF at 28 days. The flexure strength was only slightly improved by adding CF. The splitting tensile strength was improved 19% at 57 days. Overall, the addition of CF into the concrete admixture improves the adhesion between the cement paste and the gravel aggregate interphase interaction zone, thus improves the mechanical strength of the concrete produced.

TABLE 14

Properties of CF on concrete admixture made with regular river sand, cement and gravel aggregates

| Characteristic | | Mix 1 Without CF | Mix 2 0.10% CF | Mix 3 0.15% CF | Usual requirements |
|---|---|---|---|---|---|
| Compressive strength (MPa) | 7 days | 31.2 | 37.3 | 33.0 | |
| | 28 days | 36.4 | 43.5 | 39.4 | 35 min. |
| | 56 days | 40.6 | 47.4 | 42.5 | |
| Flexural strength (MPa) | 7 days | 4.4 | 4.6 | 3.8 | |
| | 28 days | 5.4 | 5.6 | 4.5 | 4.5 min. |
| Splitting tensile strength results (Brazilian) at 57 days (MPa) | | 2.6 | 3.1 | 3.1 | |

TABLE 14-continued

Properties of CF on concrete admixture made with regular river sand, cement and gravel aggregates

| Characteristic | Mix 1 Without CF | Mix 2 0.10% CF | Mix 3 0.15% CF | Usual requirements |
|---|---|---|---|---|
| Elastic modulus measured at 28 days (GPa) | 30.2 | 33.0 | 31.4 | |
| Poisson's ratio | 0.21 | 0.22 | 0.21 | |
| Air content hardened concrete, ASTM C457 (%) | 7.1 | 7.2 | 5.1 | 3.0 min. |
| Spacing factor, ASTM C457 (μm) | 166 | 184 | 207 | 260 max. |
| Scaling at 56 cycles, BNQ 2621-900 (kg/m$^2$) | 0.15 | 0.27 | 0.19 | 0.50 max. |

Various aspects described herein alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the scope of the following claims and the disclosure should not be limited by the embodiments set forth in the examples, but should be given the broadest reasonable interpretation consistent with the description as a whole.

The invention claimed is:

1. A concrete composition comprising:
   a) a hydraulic binder;
   b) a superfine sand, wherein said superfine sand is a sand with a fineness modulus below 2.11 as classified according to ASTM C136-01, or a sand with a fineness modulus below 1.5 as classified according to GB/T14684-2001;
   c) a filamentous cellulose, wherein the filamentous cellulose is a cellulose filament (CF), cellulose nano filaments, a cellulose nanofibril (CNF) or a microfibrillated cellulose (MFC); and
   d) a sand with a fineness modulus over 2.9 as classified according to ASTM C136-01.

2. The composition of claim 1, wherein the superfine sand is a desert sand or an Ottawa sand.

3. The composition of claim 2, wherein the desert sand is Yellow desert sand, dune sand, Qatar desert sand, Gobi desert sand, red desert sand, black desert sand, or a combination thereof.

4. The composition of claim 1, wherein the filamentous cellulose has an average length up to 2 mm, and an average width of from 3 nm to 500 nm.

5. The composition of claim 1, wherein the hydraulic binder is selected from the group consisting of a Portland cement, a high alumina cement, a lime cement, a kiln dust cement, a high phosphate cement, a ground granulated blast furnace slag cement, a fly ash, a lime, a gypsum and combinations thereof.

6. The composition of claim 1, wherein the hydraulic binder is a Portland cement.

7. The composition of claim 1, wherein the filamentous cellulose to hydraulic binder is in a weight % of less than 5% by weight of the hydraulic binder.

8. The composition of claim 1, wherein the filamentous cellulose weight % to the hydraulic binder is in a range from 0.001% to 5% by weight.

9. The composition of claim 1, further comprising a coarse aggregate.

10. The composition of claim 9, wherein the coarse aggregate is gravel, silicate, a clay, a metal oxide, a metal hydroxide, or a mixture thereof.

11. The composition of claim 9, wherein the coarse aggregate is in a range of average particles sizes of 5 mm to 40 mm.

12. The composition of claim 1, wherein the sand with a fineness modulus over 2.9 is a natural sand.

13. The composition of claim 12, wherein the natural sand is a river sand, a river bank sand, a beach sand, or a combination thereof.

14. The composition of claim 1, wherein the sand with a fineness modulus over 2.9 is a Lafarge sand.

15. The composition of claim 1, wherein said composition is a concrete/mortar mix, a concrete mix, a mortar mix, a mortar composition, or a concrete/mortar sand adhesion additive.

16. A method of preparing the concrete composition of claim 1 comprising:
   providing the hydraulic binder;
   providing the superfine sand, wherein said superfine sand is a sand with a fineness modulus below 2.11 as classified according to ASTM C136-01, or a sand with a fineness modulus below 1.5 as classified according to GB/T14684-2001;
   providing the filamentous cellulose, wherein the filamentous cellulose is a cellulose filament (CF), cellulose nano filaments, a cellulose nanofibril (CNF) or a microfibrillated cellulose (MFC);
   providing the sand, with a fineness modulus over 2.9 as classified according to ASTM C136-01, and
   mixing said sand, the hydraulic binder, the superfine sand, and the filamentous cellulose,
   wherein the filamentous cellulose creates a network adhering to the hydraulic binder and the superfine sand.

17. The method of claim 16, further comprising adding a coarse aggregate.

* * * * *